(12) United States Patent
Hashemi et al.

(10) Patent No.: US 10,146,691 B2
(45) Date of Patent: Dec. 4, 2018

(54) SYSTEM AND METHOD FOR PERFORMING PARTIAL CACHE LINE WRITES WITHOUT FILL-READS OR BYTE ENABLES

(71) Applicant: INTEL CORPORATION, Santa Clara, CA (US)

(72) Inventors: Hashem Hashemi, Folsom, CA (US); Saurabh Sharma, El Dorado Hills, CA (US); Altug Koker, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/374,630

(22) Filed: Dec. 9, 2016

(65) Prior Publication Data

US 2018/0165201 A1 Jun. 14, 2018

(51) Int. Cl.
*G06F 12/16* (2006.01)
*G06F 12/0842* (2016.01)

(52) U.S. Cl.
CPC .. *G06F 12/0842* (2013.01); *G06F 2212/1024* (2013.01); *G06F 2212/1041* (2013.01)

(58) Field of Classification Search
None
See application file for complete search history.

(56) References Cited

U.S. PATENT DOCUMENTS

| 5,561,780 | A | * | 10/1996 | Glew | G06F 12/0888 710/52 |
| 6,205,506 | B1 | * | 3/2001 | Richardson | G06F 12/0802 710/310 |
| 6,483,516 | B1 | * | 11/2002 | Tischler | G06F 12/0811 345/537 |
| 2004/0193757 | A1 | * | 9/2004 | Creta | G06F 13/4027 710/33 |
| 2016/0314069 | A1 | * | 10/2016 | Luttrell | G06F 12/0811 |

* cited by examiner

*Primary Examiner* — Duc Doan
(74) *Attorney, Agent, or Firm* — Womble Bond Dickinson (US) LLP

(57) ABSTRACT

One embodiment provides for a memory system comprising a cache memory and a cache control circuit to receive a request to perform a partial cache line write to a first cache line of the cache memory, merge the request to perform the partial cache line write with a pending request to write to the first cache line, and process a merged request as a full cache line write.

22 Claims, 28 Drawing Sheets

| 127 | 120 119 | 112 111 | 104 103 | 96 95 | | | 32 31 | 24 23 | 16 15 | 8 7 | 0 |
|---|---|---|---|---|---|---|---|---|---|---|---|
| BYTE 15 | BYTE 14 | BYTE 13 | BYTE 12 | | • • • | | BYTE 3 | BYTE 2 | BYTE 1 | BYTE 0 |

PACKED BYTE
310

FIGURE 3A(1)

| 127 | | 112 111 | 96 95 | | | 32 31 | 16 15 | 0 |
|---|---|---|---|---|---|---|---|---|
| WORD 7 | | WORD 6 | | • • • | | WORD 1 | WORD 0 |

PACKED WORD
320

FIGURE 3A(2)

| 127 | | | 96 95 | | | 32 31 | | 0 |
|---|---|---|---|---|---|---|---|---|
| DOUBLEWORD 3 | | | | • • • | | DOUBLEWORD 0 | | |

PACKED DOUBLEWORD
330

FIGURE 3A(3)

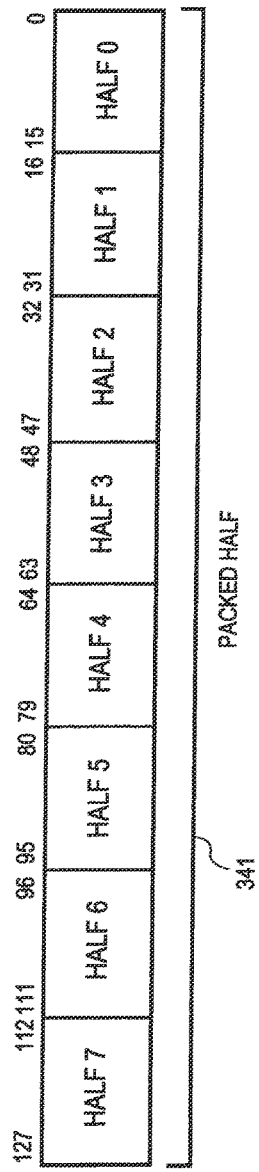
FIGURE 3B(1)
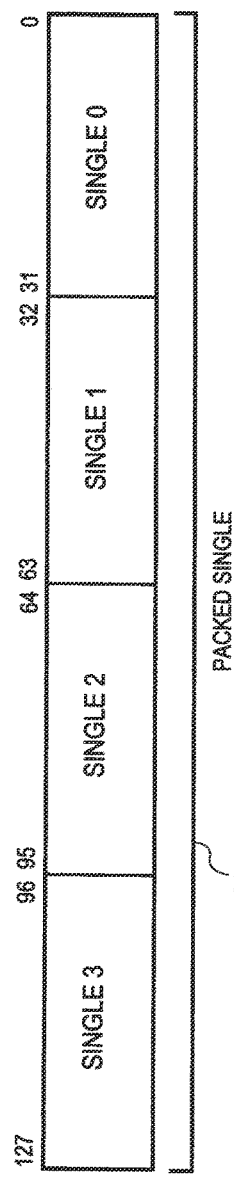
FIGURE 3B(2)
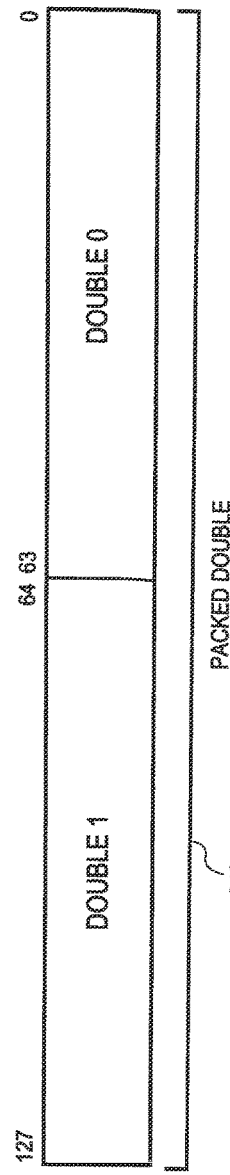
FIGURE 3B(3)

| 127 120 | 119 112 | 111 104 | 103 | | | 24 23 | 16 15 | 8 7 | 0 |
|---|---|---|---|---|---|---|---|---|---|
| bbbb bbbb | bbbb bbbb | bbbb bbbb | • | • | • | bbbb bbbb | bbbb bbbb | bbbb bbbb |

UNSIGNED PACKED BYTE REPRESENTATION 344

FIGURE 3C(1)

| 127 120 | 119 112 | 111 104 | 103 | | | 24 23 | 16 15 | 8 7 | 0 |
|---|---|---|---|---|---|---|---|---|---|
| sbbb bbbb | sbbb bbbb | sbbb bbbb | • | • | • | sbbb bbbb | sbbb bbbb | sbbb bbbb |

SIGNED PACKED BYTE REPRESENTATION 345

FIGURE 3C(2)

| 127 | 112 | 111 | | | | 16 | 15 | 0 |
|---|---|---|---|---|---|---|---|---|
| wwww wwww wwww wwww | | | • | • | • | wwww wwww wwww wwww | | |

UNSIGNED PACKED WORD REPRESENTATION 346

FIGURE 3C(3)

| 127 | 112 | 111 | | | | 16 | 15 | 0 |
|---|---|---|---|---|---|---|---|---|
| swww wwww wwww wwww | | | • | • | • | swww wwww wwww wwww | | |

SIGNED PACKED WORD REPRESENTATION 347

FIGURE 3C(4)

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRESENTATION 348

FIGURE 3C(5)

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIGURE 3C(6)

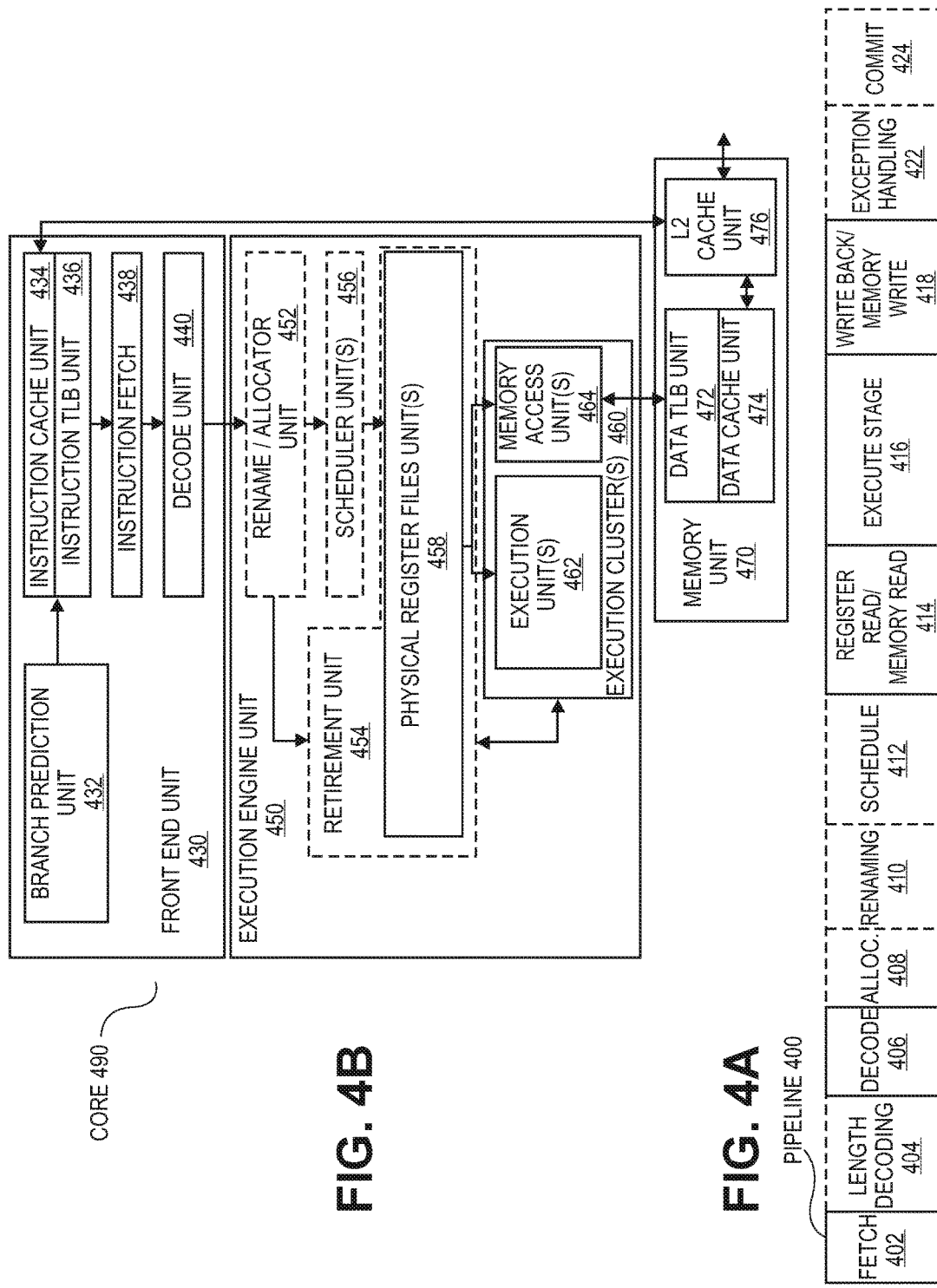

SYSTEM AND METHOD FOR PERFORMING PARTIAL CACHE LINE WRITES WITHOUT FILL-READS OR BYTE ENABLES

FIELD OF THE INVENTION

The present disclosure pertains to the field of processing logic, microprocessors, and associated memory systems. In particular, embodiments are related to performing partial cache line writes without fill-reads or byte enables.

DESCRIPTION OF RELATED ART

A write operation by a processor or other device can involve a write to an entire cache line or a write to only a portion of a cache line. A partial write request is a write request that does not cover an entire cache line. When a partial write request misses (e.g., is not present) in a write-back cache, either a read request to higher levels of the memory hierarchy is performed to 'fill' the missing portions of the cache line or the cache lines will employ byte 'valid' bits to indicate which bytes hold valid data. These techniques are necessary for cache write-back operations that occur upon eviction of modified lines to return correct modified data to higher levels of the memory hierarchy. However, fill read requests and byte valid bits can introduce significant performance and power overhead into the cache memory system.

DESCRIPTION OF THE FIGURES

Embodiments are illustrated by way of example and not limitation in the Figures of the accompanying drawings:

FIG. 3A(1)-(3) illustrates packed data types according to one embodiment;

FIG. 3B(1)-(3) illustrates packed data types according one embodiment;

FIG. 3C(1)-(6) illustrates packed data types according to one embodiment;

FIG. 4A illustrates elements of a processor micro-architecture according to one embodiment;

FIG. 4B illustrates elements of a processor micro-architecture according to one embodiment;

DETAILED DESCRIPTION

Figure 1A:
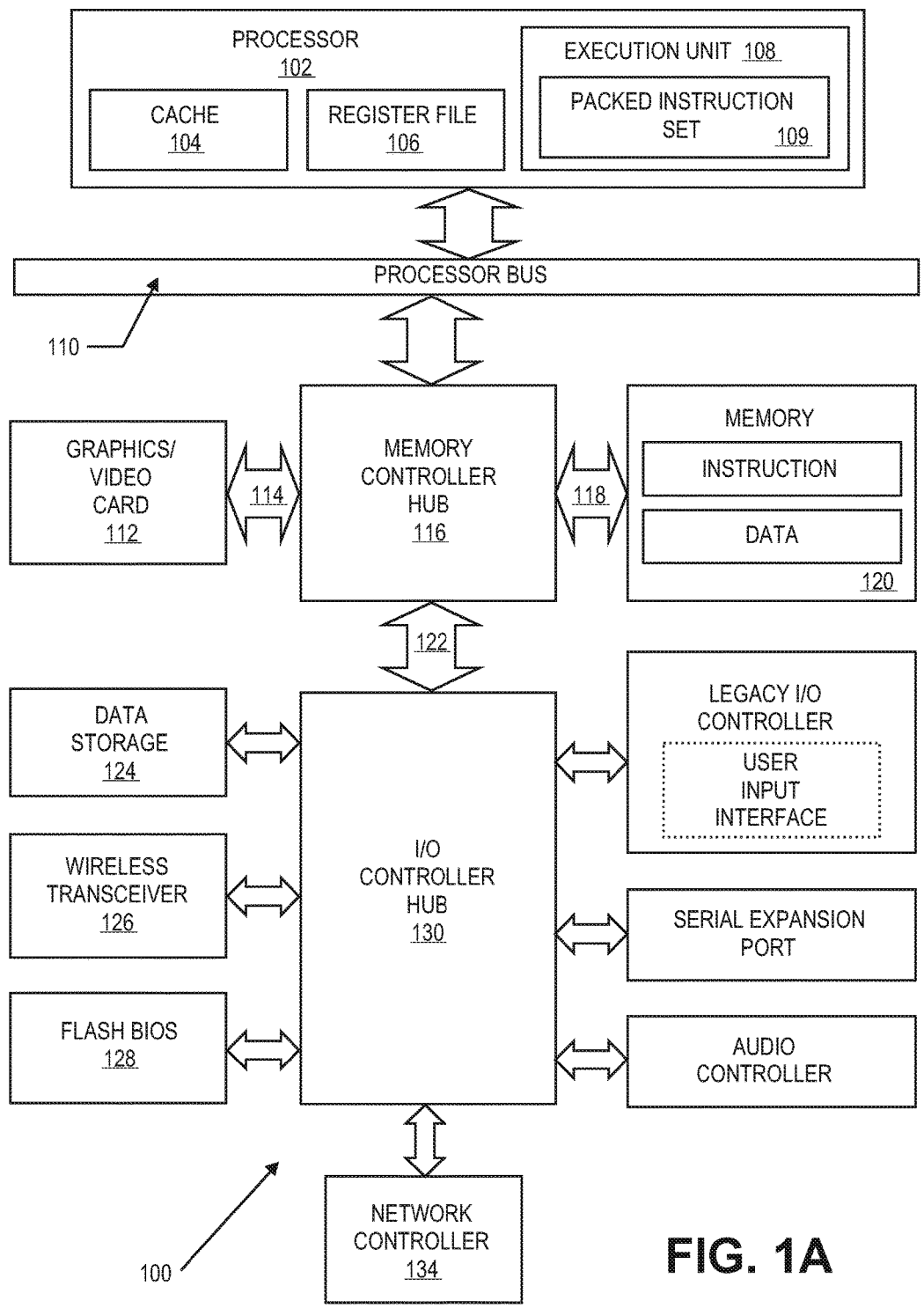
FIG. 1A is a block diagram of a system according to one embodiment.

The following description describes cache memory logic that exploits the fact that in some computational workloads and, in particular, certain graphics processing workloads, partial write requests tend to occur in batches that, in aggregate fill, out the cache lines being written to, even if each request in itself may be a partial write. In such circumstances, the need for byte valid bits or fill read operations can be averted by letting the partial writes wait to be collapsed with later writes to the same line that follow, forming full line writes which inherently do not require fill reads or byte valid bits. Due to its minimal hardware overhead, embodiments presented herein can enable a heterogeneous compute and/or graphics processing architecture that can perform significantly more efficiently when executing certain types of workloads.

In the following description, numerous specific details such as processing logic, processor types, micro-architectural conditions, events, enablement mechanisms, and the like are set forth in order to provide a more thorough understanding of the embodiments described herein. One skilled in the art will appreciate that the invention may be practiced without such specific details.

Although the following embodiments are described with reference to a processor, other embodiments are applicable to other types of integrated circuits and logic devices. Similar techniques and teachings can be applied to other types of circuits or semiconductor devices that can benefit from higher pipeline throughput and improved performance. The teachings of the embodiments are applicable to any processor or machine that performs data manipulations. However, the embodiments are not limited to processors or machines that perform 512-bit, 256-bit, 128-bit, 64-bit, 32-bit, or 16-bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments rather than to provide an exhaustive list of all possible implementations of embodiments.

Although the below examples describe instruction handling and distribution in the context of execution units and logic circuits, other embodiments can be accomplished by way of a data or instructions stored on a machine-readable, tangible medium, which when performed by a machine cause the machine to perform functions consistent with at least one embodiment of the invention. In one embodiment, functions associated with embodiments are embodied in machine-executable instructions. The instructions can be used to cause a general-purpose or special-purpose processor that is programmed with the instructions to perform operations as described herein. Embodiments can be provided as a computer program product or software which may include a machine or computer-readable medium having stored thereon instructions which may be used to program a computer (or other electronic devices) to perform one or more operations according to embodiments described herein. Alternatively, operations can be performed by specific hardware components that contain fixed-function logic for performing the steps, or by any combination of programmed computer components and fixed-function hardware components. Instructions used to program logic to perform embodiments of the invention can be stored within a memory in the system, such as DRAM, cache, flash memory, or other storage. Furthermore, the instructions can be distributed via a network or by way of other computer readable media.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with an embodiment described herein. System 100 includes a component, such as a processor 102 to employ execution units including logic to perform algorithms for processing data, such as in the embodiment described herein. System 100 is representative of processing systems based on the PENTIUM, CORE, Xeon, and/or Atom microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments are not limited to any specific combination of hardware circuitry and software.

Embodiments are not limited to computer systems. Alternative embodiments can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction, according to an embodiment. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

In one embodiment a memory controller hub (MCH) 116 is coupled to the processor bus 110 and memory 120. The processor 102 can communicate to the MCH 116 via a processor bus 110. The MCH 116 is a system logic chip that provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

In some embodiments the system I/O 122 is a proprietary hub interface bus that is used to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
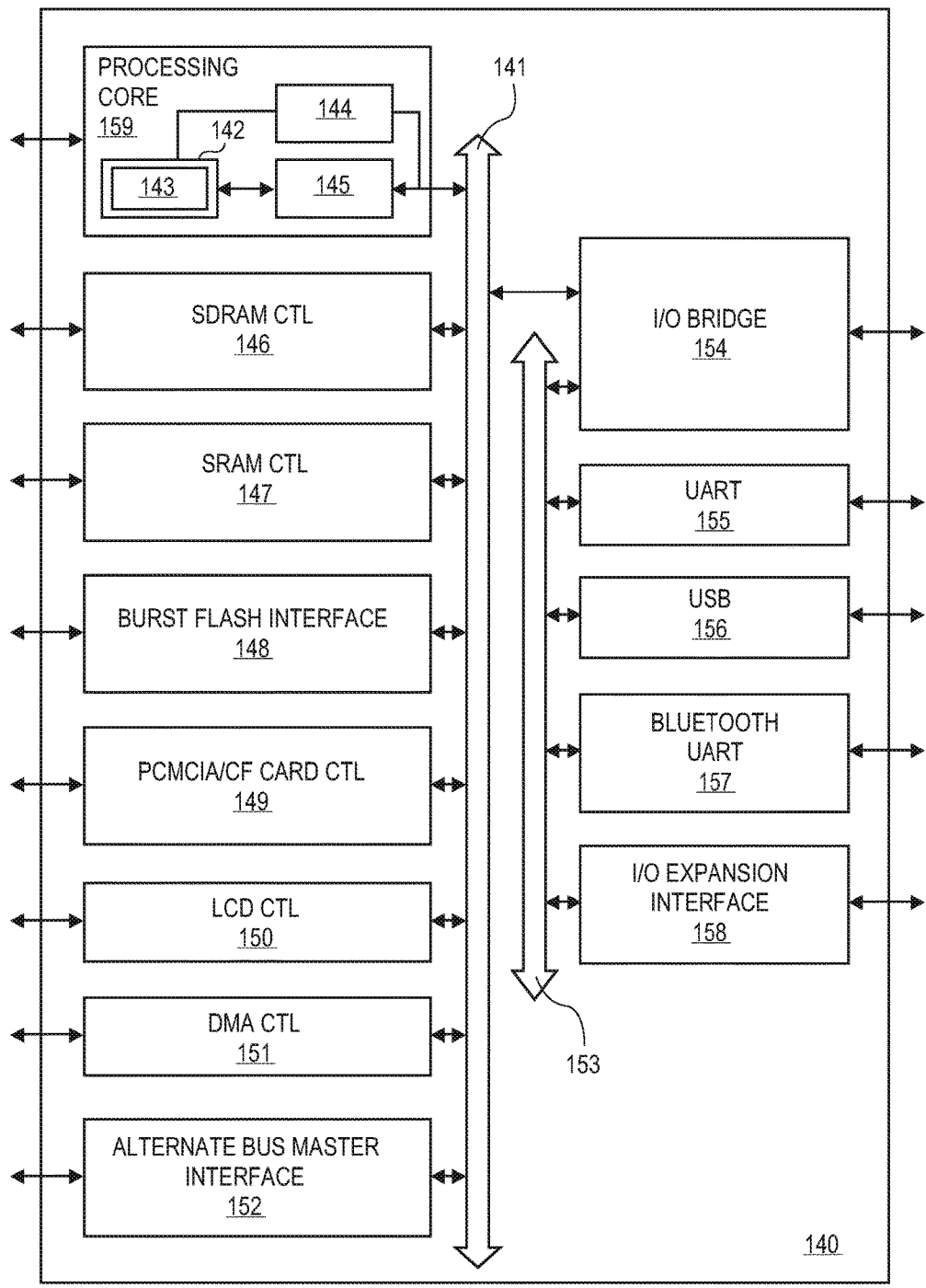
FIG. 1B is a block diagram of a system according to one embodiment.

FIG. 1B illustrates a data processing system 140 which implements the principles of one embodiment. It will be readily appreciated by one of skill in the art that the embodiments described herein can be used with alternative processing systems without departure from the scope of embodiments of the invention.

The data processing system 140 comprises a processing core 159 capable of performing at least one instruction in accordance with one embodiment. For one embodiment, processing core 159 represents a processing unit of any type of architecture, including but not limited to CISC, RISC or VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the various embodiments. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
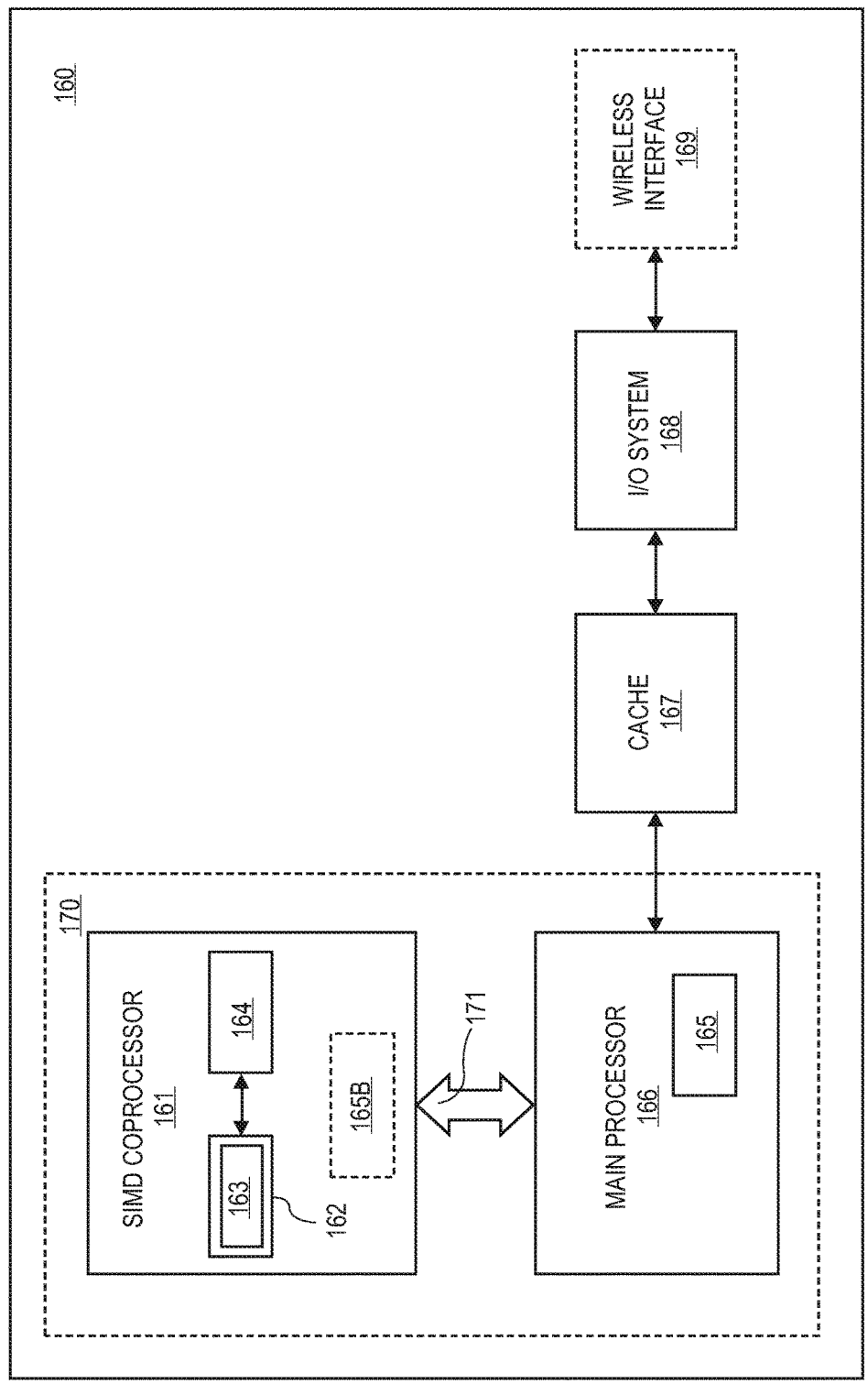
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 166 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the embodiments described herein.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
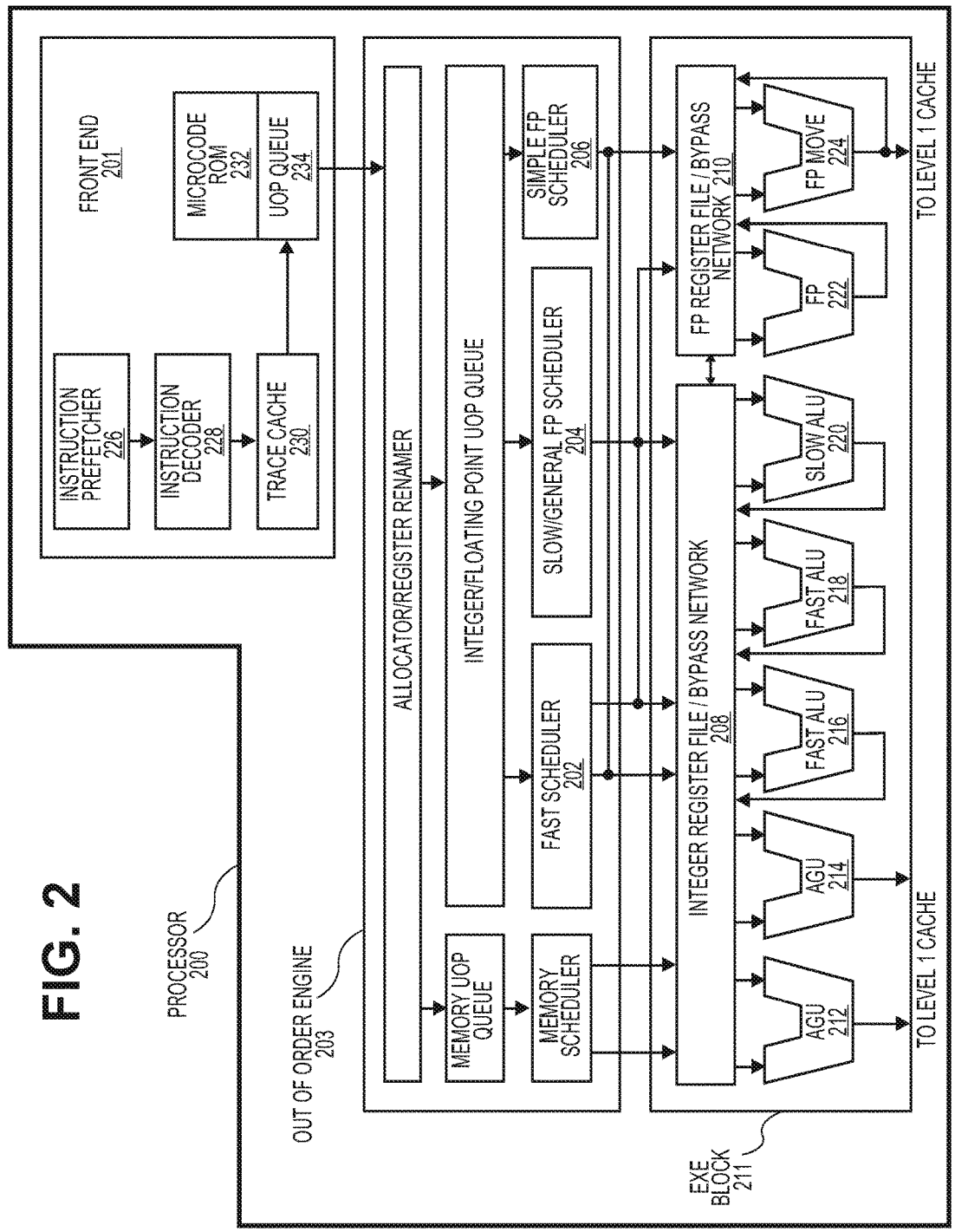
FIG. 2 is a block diagram of a processor according to one embodiment.

FIG. 2 is a block diagram of the micro-architecture for a processor 200 that includes logic circuits to perform instructions, according to an embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128-bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. Instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128-bit wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128-bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

In the examples of the following figures, a number of data operands are described. FIG. 3A(1)-(3) illustrate various packed data type representations in multimedia registers, according to an embodiment. FIG. 3A(1)-(3) illustrates data types for a packed byte 310, a packed word 320, and a packed doubleword (dword) 330 for 128-bit wide operands, respectively. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A(1)-(3) are 128 bits long, embodiments are provided that also operate with64 bit wide or other sized operands. The packed word format 320 of this example is 128 bits long and contains eight packed word data elements. Each packed word contains sixteen bits of information. The packed doubleword format 330 of FIG. 3A(3) is 128 bits long and contains four packed doubleword data elements. Each packed doubleword data element contains thirty two bits of information. A packed quadword is 128 bits long and contains two packed quad-word data elements.

FIG. 3B(1)-(3) illustrates alternative in-register data storage formats. Each packed data can include more than one independent data element. Three packed data formats are illustrated; packed half 341(FIG. 3B(1)), packed single 342(FIG. 3B(2)), and packed double 343(FIG. 3B(3)). One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C(1)-(6) illustrates various signed and unsigned packed data type representations in multimedia registers, according to an embodiment. In FIG. 3C(1) unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. In FIG. 3C(2), signed packed byte representation 345 illustrates the storage of a signed packed byte. Note that the eighth bit of every byte data element is the sign indicator. In FIG. 3C(3), unsigned packed word representation 346 illustrates how word seven through word zero are stored in a SIMD register. In FIG. 3C(4) signed packed word representation 347 is similar to the unsigned packed word in-register representation 346. Note that the sixteenth bit of each word data element is the sign indicator. In FIG. 3C(5), unsigned packed doubleword representation 348 shows how doubleword data elements are stored. In FIG. 3C(6), signed packed doubleword representation 349 is similar to unsigned packed doubleword in-register representation 348. Note that the necessary sign bit is the thirty-second bit of each doubleword data element.

Figure 3D:
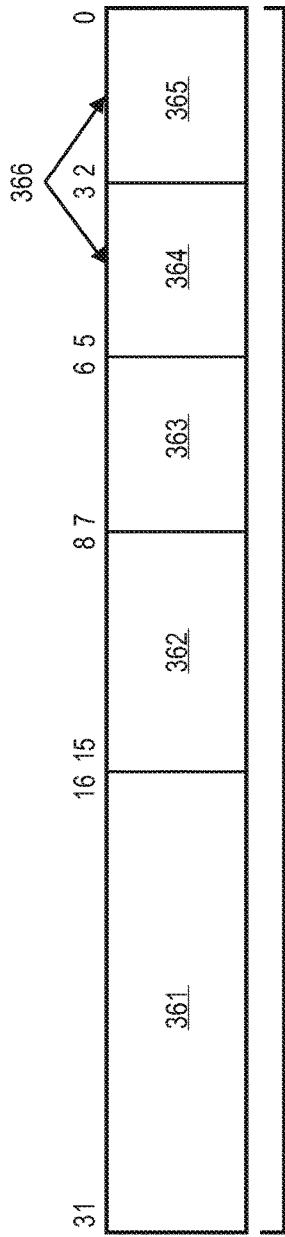
FIG. 3D illustrates an instruction encoding according to one embodiment.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
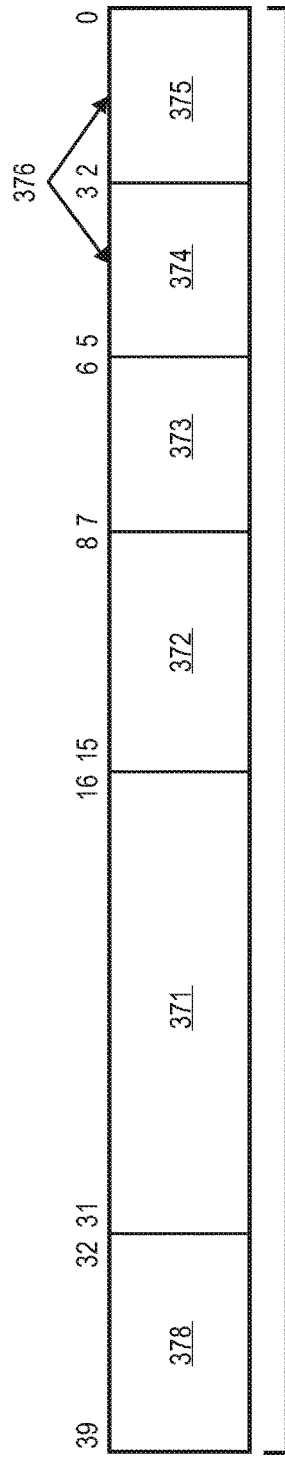
FIG. 3E illustrates an instruction encoding according to one embodiment.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
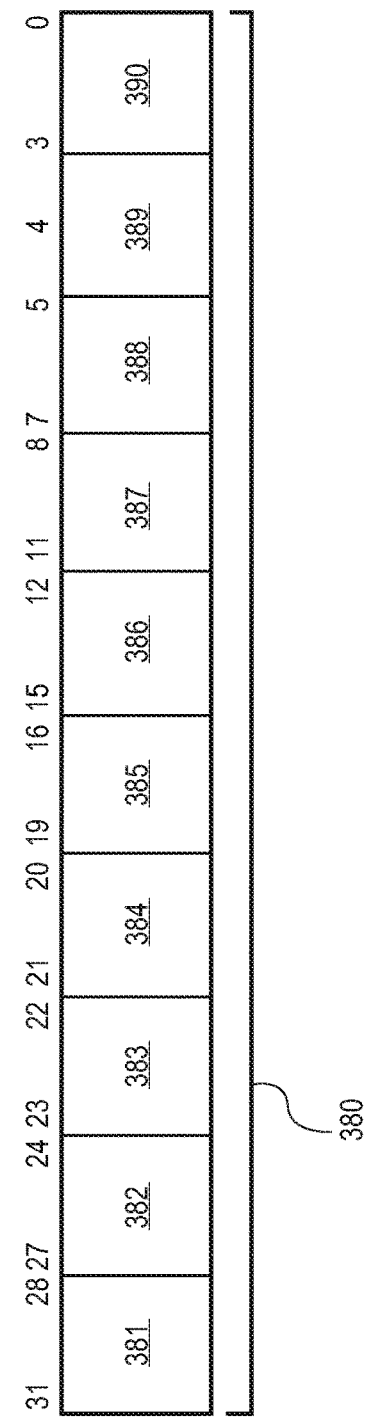
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed)—etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
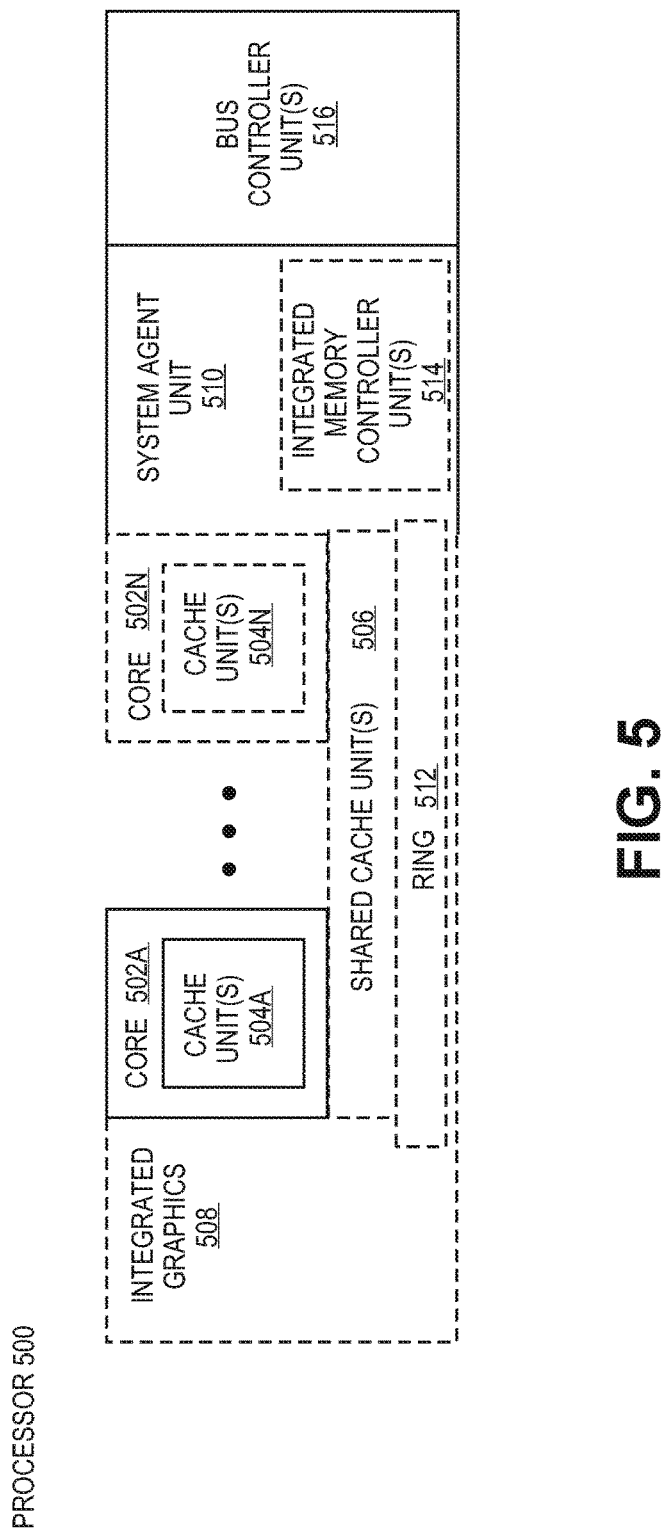
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic including integrated graphics logic 508. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy is a portion of an overall memory hierarchy for the processor that includes one or more internal cache units 504A-504N, the one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc.. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
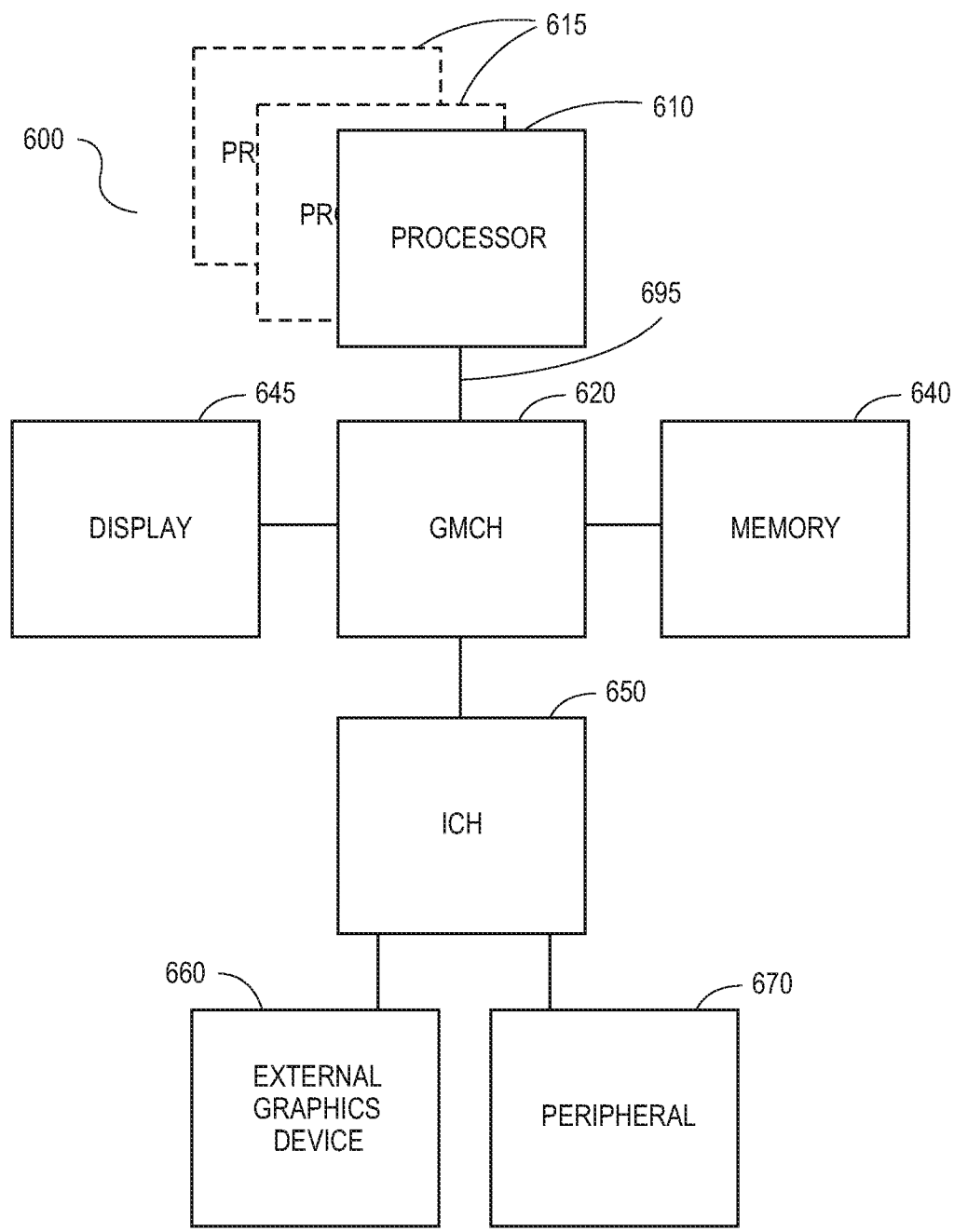
FIG. 6 is a block diagram of a computer system according to one embodiment.
Figure 7:
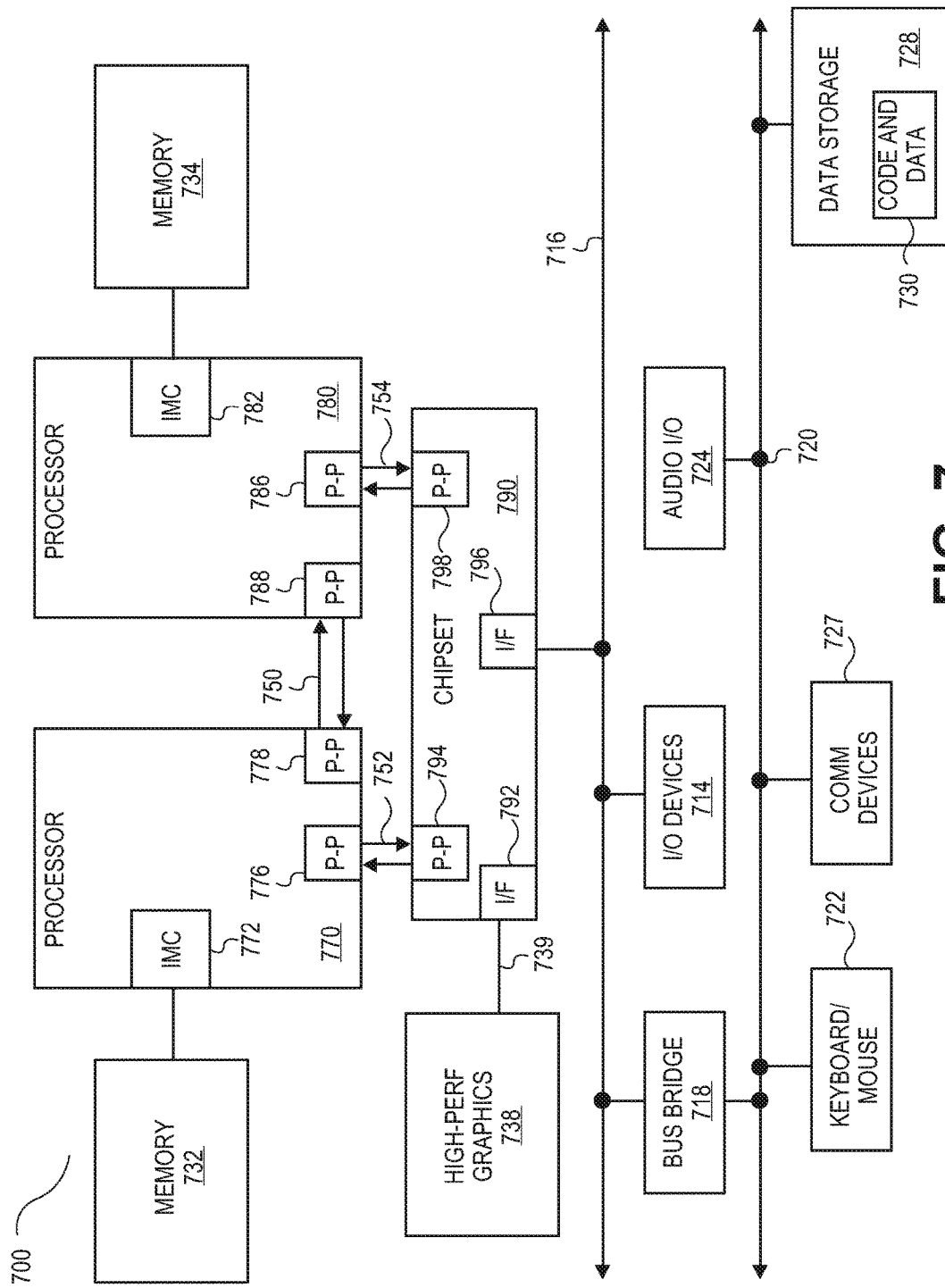
FIG. 7 is a block diagram of a computer system according to one embodiment.
Figure 8:
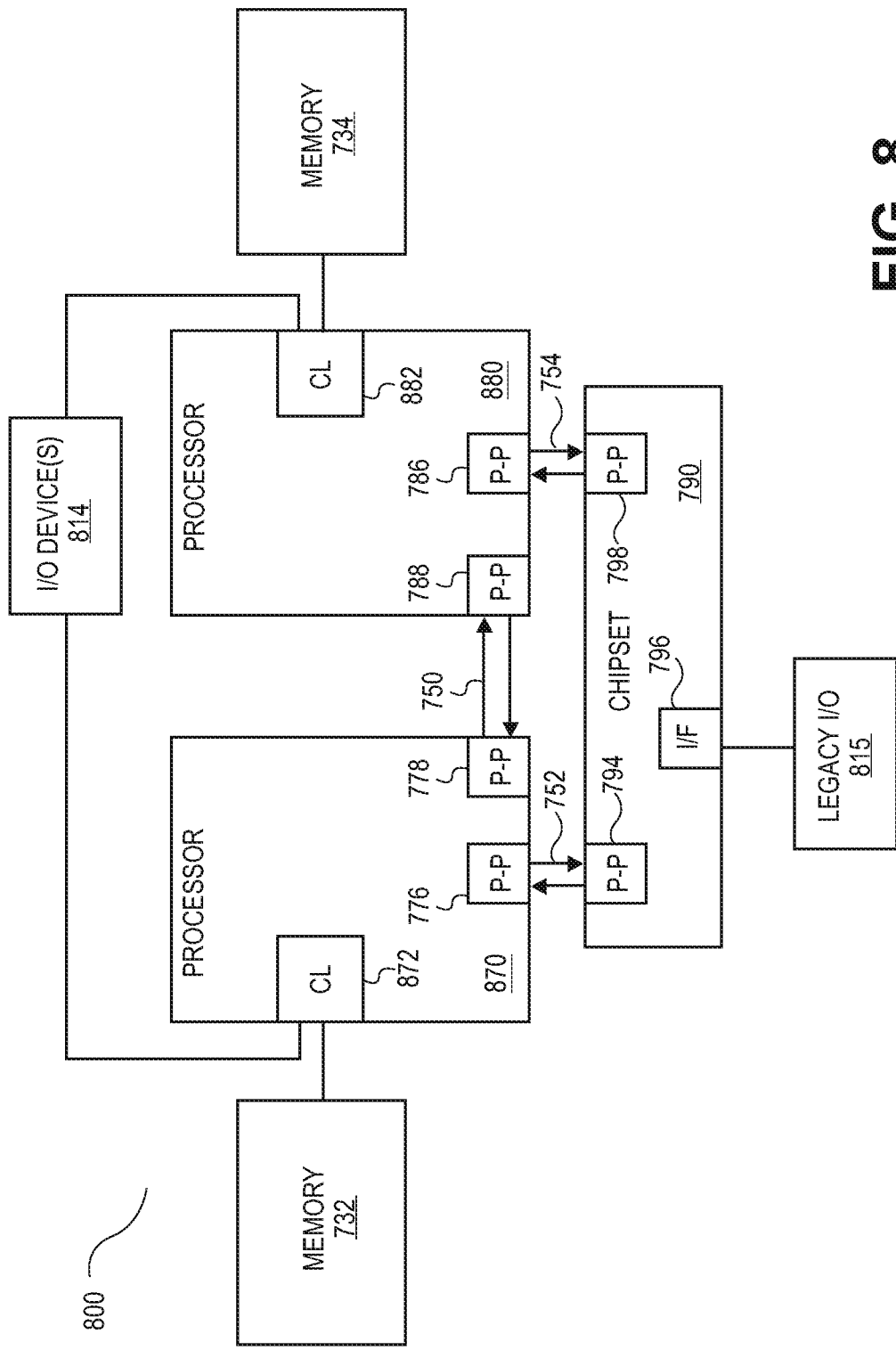
FIG. 8 is a block diagram of a computer system according to one embodiment.
Figure 9:
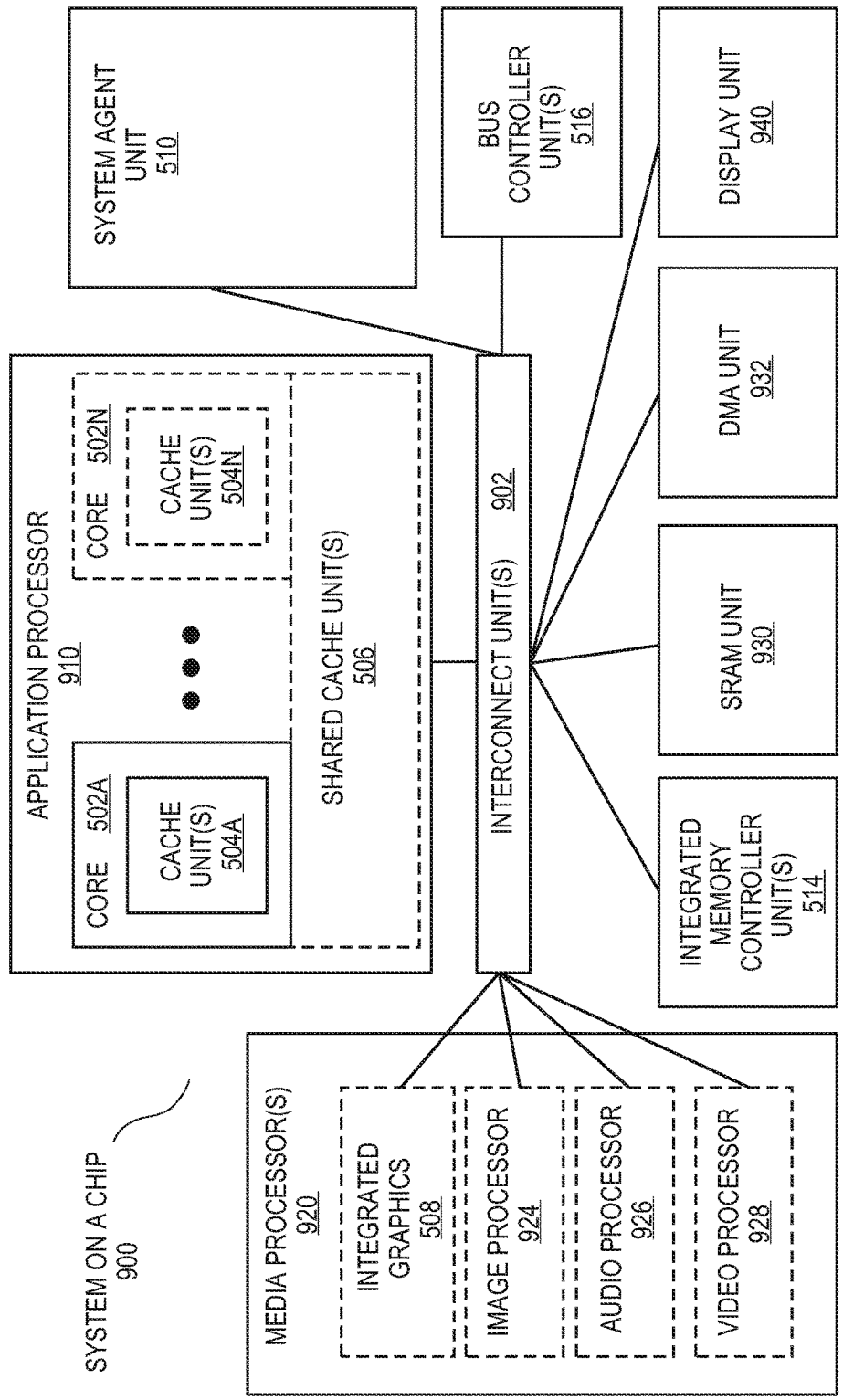
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the processor 500. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the embodiments is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 across a high-performance graphics interface 739 that is coupled with the chipset 790 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the embodiments is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872,

882 may include integrated memory controller units such as the integrated memory controller unit(s) 514 of FIG. 5 and the IMCs 772 and 782 of FIG. 7. In addition. CL 872, 882 may also include I/O control logic. FIG. 8 illustrates that not only are the memories 732, 734 coupled to the CL 872, 882, but also that one or more I/O device(s) 814 are also coupled to the control logic 872, 882. Legacy I/O devices 815 may be coupled to the chipset 790, for example, if those devices are not or cannot be coupled via the CL 872, 882.

Referring now to FIG. 9, shown is a block diagram of a SoC 900 in accordance with an embodiment. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N including internal cache unit(s) 504A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
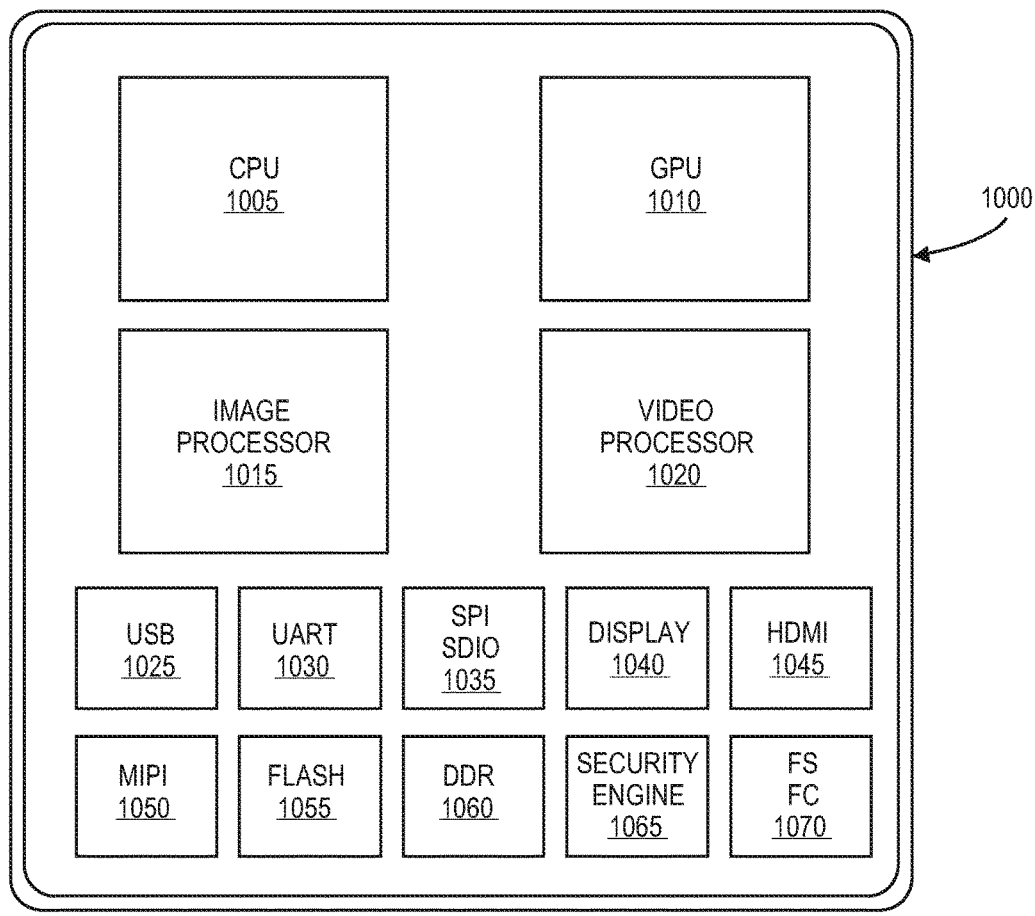
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, HDMI interface 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines 1165 that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
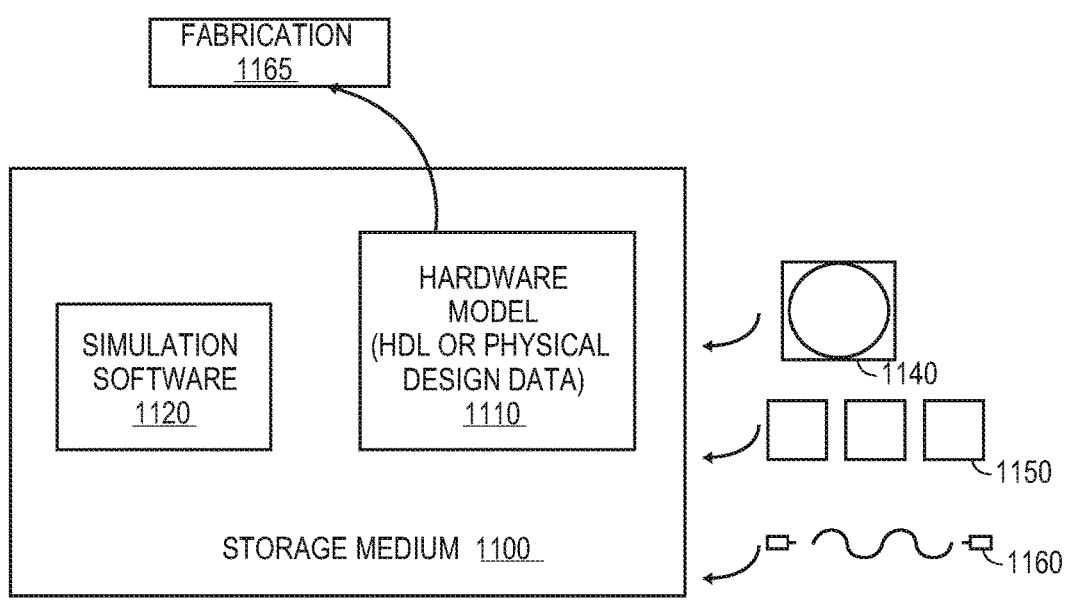
FIG. 11 is a block diagram of an IP core development system according to one embodiment.

FIG. 11 shows a block diagram illustrating the development of IP cores according to one embodiment. A Storage medium 1100 includes simulation software 1120 and/or hardware or software model 1110. In one embodiment, the data representing the IP core design can be provided to the storage medium 1100 via memory 1140 (e.g., hard disk), wired connection (e.g., internet) 1150 or wireless connection 1160. The IP core information generated by the simulation tool and model can then be transmitted to a fabrication facility where it can be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
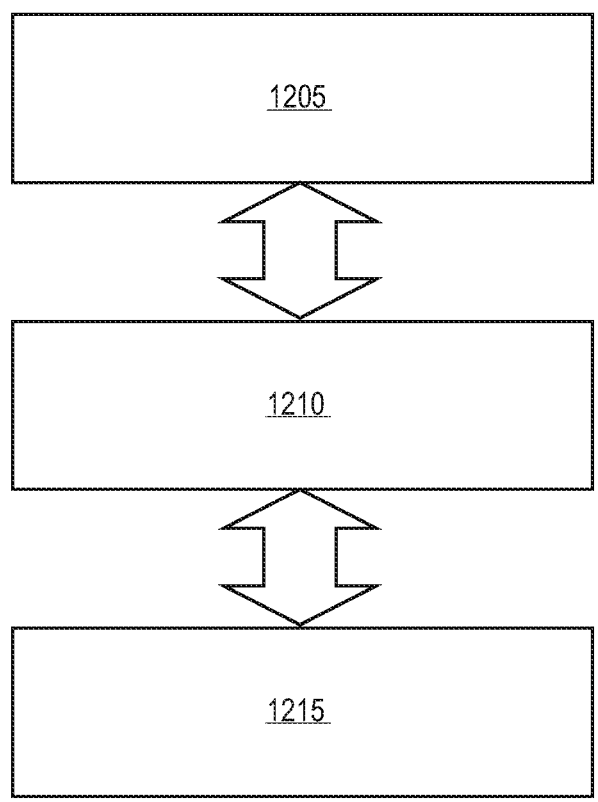
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in tangible form within non-transitory machine-readable media containing software by executing microcode or firmware contained in or associated with the processor.

Figure 13:
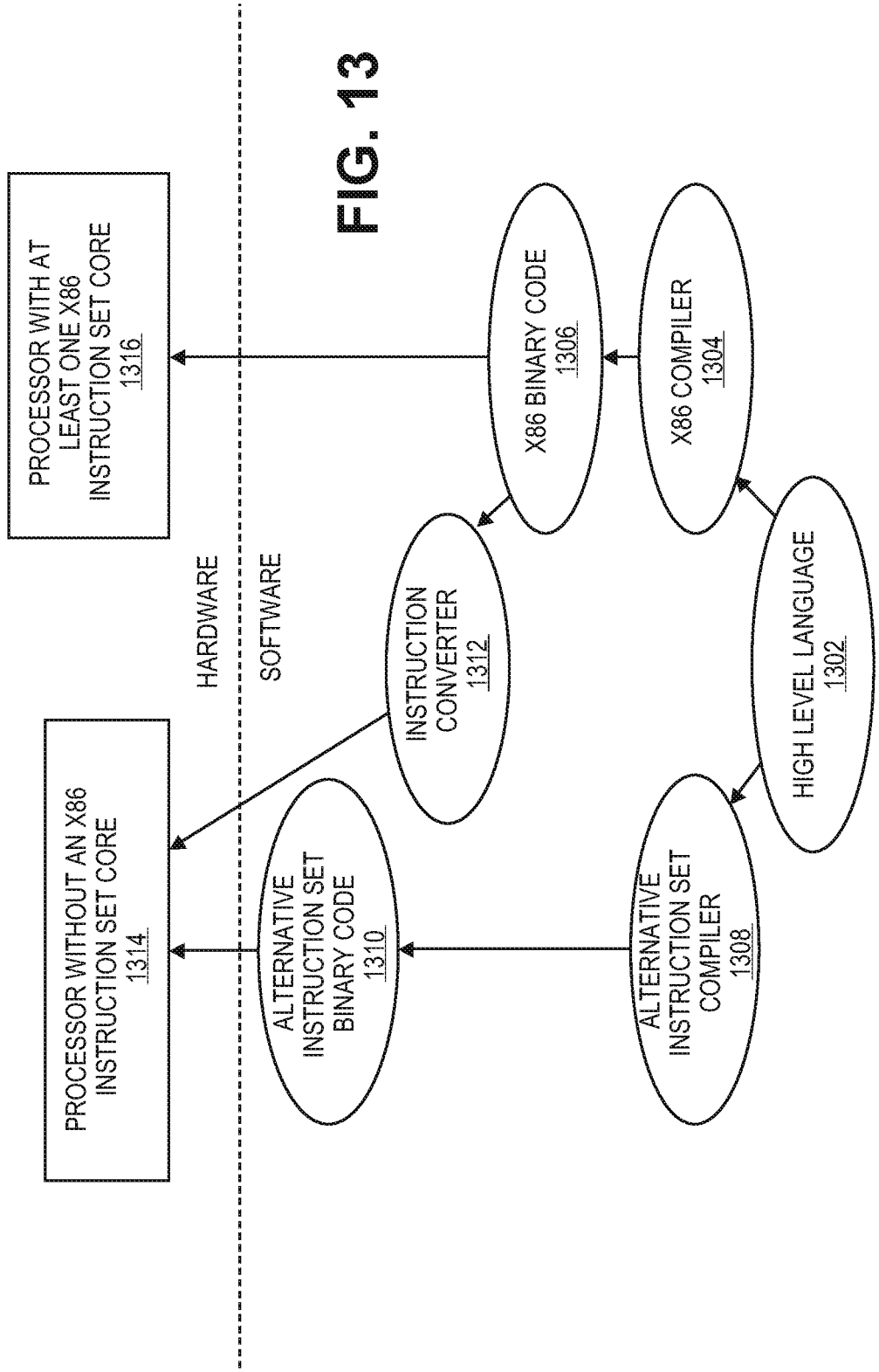
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Embodiments described herein are directed to a cache memory that may be employed within a graphics processor or a general-purpose processor. Specifically, the cache memory provided by embodiment described herein enable a more efficient mechanism of handling partial-write misses to a cache line. Prior solutions to dealing with a partial write miss consist of either (a) filling the missing portions of a line being written to by performing a fill read operation, (b) incorporating dedicated byte valid bits in the cache to keep track of which bytes should be evicted to higher levels of memory hierarchy upon an eviction of the line. Both solutions have heavy hardware and performance overheads. Fill read operations involve sending read requests across lengthy and power consuming buses. Incorporating byte valid bits for every line of cache adds ~12% gate count to a cache (not accounting for the interconnect overhead) and increases power leakage. The cache memory provided by embodiments described herein avoids such drawbacks.

Baseline Cache Architecture

Figure 14:
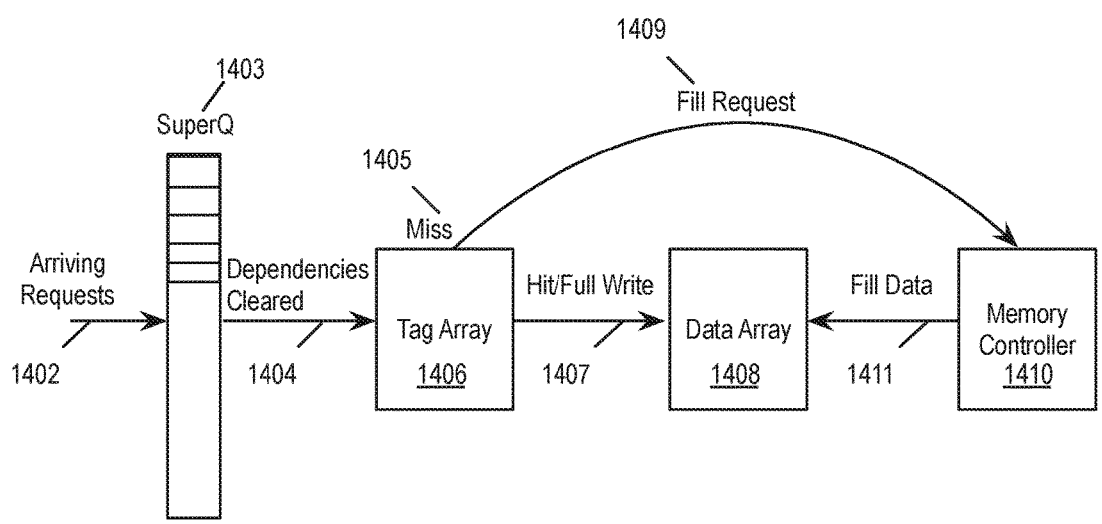
FIG. 14 is a block diagram of a baseline implementation of a cache architecture.

FIG. 14 is a block diagram of a baseline implementation of a cache architecture 1400. In one baseline implementation, an ordering buffer (e.g., SuperQ 1403) is used to maintain the order of arriving requests 1402 at the cache. When all ordering conflicts of a request in the SuperQ 1403 are cleared (dependencies cleared 1404), the request can proceed to the tag array 1406, where the tag array is accessed to perform a lookup to determine if the line of interest is present in the cache. If present, requests proceed to the data array 1408 and cause operations to be performed to retrieve the data (hit' of hit/full write 1407 in the case of a read operation) or modify the stored data (full write' of hit/full write 1407 in the case of a write operation). In the case that the requested line is not present in the cache tag array (miss 1405), a present line is cleared out of the data array 1408 to make room for a new line, which generates an eviction to higher levels of the memory hierarchy if the line being replaced is dirty. Based on the cache coherency algorithm in place a request-for-ownership (RFO) can be sent to higher levels of the memory hierarchy to inform the memory controller 1410 that the requested line is now present in this cache.

When the request is a read or partial write operation and the line was not present in the cache, a read request (e.g., fill request 1409) is sent to higher levels of the memory hierarchy to retrieve the data (fill data 1411) of the requested line. Writes that cover an entire cache line do not need a fill operation as all the data of the line will just be completely overwritten, thus, no fill data 1411 is returned in that scenario. Instead, only an RFO is sent.

Cache with Dedicated Write Combining Buffer

Figure 15:
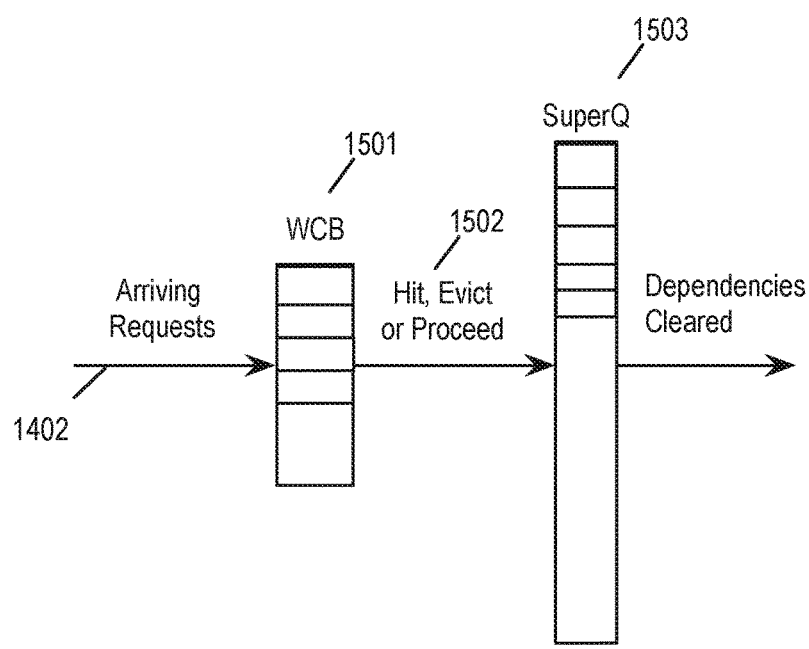
FIG. 15 illustrates a cache memory with a dedicated write combining buffer, according to an embodiment

FIG. 15 illustrates a cache memory 1500 with a dedicated write combining buffer, according to an embodiment. In one embodiment the cache memory 1500 includes a dedicated write combining buffer (WCB 1501) that is introduced before a SuperQ 1503. In one embodiment the WCB 1501 includes a content addressable memory (CAM) that can be searched to determine if an incoming partial write request is to cache line for which other partial write requests are pending. The destination addresses of an arriving request 1402 at the cache can be looked up in the WCB 1501. Depending on the request type, one of several operations will be performed. If the arriving request 1402 is a partial write and no partial write to the same line is present in WCB 1501, a new entry is allocated in the WCB 1501 for the address of the arriving request. 1402. If the WCB 1501 is full, the oldest request in the WCB 1501 is evicted to the SuperQ 1503 without having been primed out (e.g., combined into a full line write) to make room for the newer request. If a request to the same line address, however, is already present in the WCB 1501, the request is merged with the arriving request and the byte-enable mask and data of the WCB entry is updated to reflect the combined write operation.

If the request is a full line write and the address is present in the WCB 1501, then the WCB 1501 primes out the write request and the matching address entry in the WCB 1501 can be discarded. The write request then proceeds to the SuperQ 1503 as in the baseline cache architecture 1400 as in FIG. 14.

If the arriving request is a read and the same address is present in the WCB 1501, the partial write is first removed from the WCB 1501 and pushed to the SuperQ 1503 (without having been primed out) and then the read operation is pushed to the SuperQ 1503. If the address is not present in the WCB 1501 the read operations will proceed to the SuperQ 1503 as in the baseline cache architecture 1400 of FIG. 14.

In one embodiment a request remain in the WCB 1501 until one of the following conditions are met: (a) the line being written to is primed out by following partial writes, (b) a read for the same line address arrives, (c) a stalling flush arrives, (d) the WCB 1501 is full, the request is at the head of the WCB 1501 and a new partial write request destined to a line not present in the WCB 1501 arrives.

When a line is ready to leave the WCB 1501 (for any of the reasons listed above) it is dispatched to the regular SuperQ 1503. If a partial write has been primed when being passed to the SuperQ 1503, it is marked as a full-line write.

Figure 16:
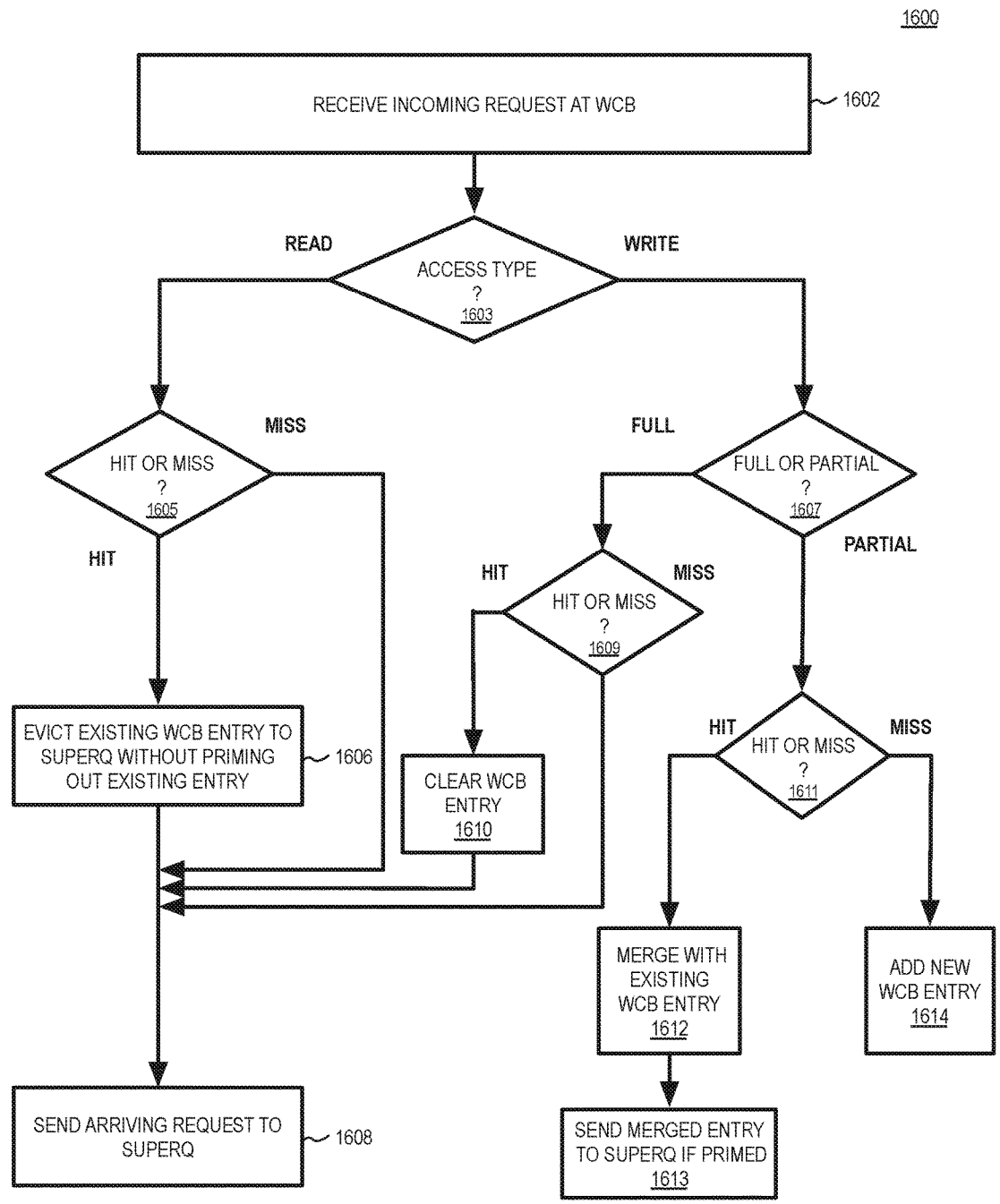
FIG. 16 is a flow diagram of logic associated with cache memory having a dedicated write combining buffer, according to an embodiment.

FIG. 16 is a flow diagram of a method 1600 performed by cache control circuitry associated with cache memory having a dedicated write combining buffer, according to an embodiment. The method 1600 can be performed by a cache control mechanism associated with a processor that includes a cache memory such as the cache memory 1500 as in FIG. 15. The cache control mechanism can be, for example, cache control logic 1920 illustrated in FIG. 19. The cache memory includes a write combining buffer (WCB 1501) and SuperQ 1503 as in FIG. 15.

As shown at 1602, the method 1600 includes receiving an incoming request at the WCB of the cache memory. The cache control mechanism can determine the access type (Read or Write) at 1603. If the cache control mechanism determines that the request is a read at 1603, the cache control mechanism can then determine if the read request hits against an entry in the WCB at 1605. If the incoming read request is a miss against the entries currently in the WCB, then the incoming requests can be sent to the SuperQ at 1608. If the incoming read request is a hit against one or more entries currently in the WCB, those one or more entries are evicted to the SuperQ at 1606 before the incoming requests is sent to the SuperQ at 1608. The eviction of existing entries in the WCB upon an arriving read request for those entries is performed to avoid a potential data hazard that can occur if the read request is allowed to pass on to the SuperQ while an associated write request remains in the WCB.

If the cache control mechanism determines that the access type is a write at 1603, the cache control mechanism can then determine if the write is a partial cache line write or a full cache line write at 1607, then determine for the potential full or partial write whether the request hits or misses an existing entry in the WCB at 1609 and 1611. If the full cache line write request does not hit against any existing entries in the WCB 1610, the full cache line write request can be sent along to the SuperQ at 1608. If the cache control mechanism determines the arriving full cache line write request hits against an existing WCB entry at 1609, the cache control mechanism can clear any existing WCB entries associated with the request, as shown at 1610, before sending the full write request to the SuperQ at 1608.

In one embodiment the primary operation of the WCB is to enable the merging of partial write requests before those requests are sent to the SuperQ. When the cache control mechanism receives an incoming requests at 1602, determines that the incoming requests is a write at 1603, and further determines that the arriving write request is a partial write at 1607, the cache control mechanism will determine at 1611 whether the arriving partial write request is a hit against any existing requests stored in the WCB. If the incoming requests are determined to be a hit against an existing request, the cache control mechanism can merge the incoming requests with the existing WCB entry at 1616. If the merge results in a primed cache line (e.g., a full cache line write), then the cache control mechanism can send the merged entry to the SuperQ at 1613. Alternatively, if the cache control mechanism determines at 1611 that the incoming partial write does not hit against an existing WCB entry (e.g., does not share a common cache line), then the cache control mechanism can add a new WCB entry at 1614.

Cache Architecture Without Dedicated Write Combining Buffer

Figure 17:
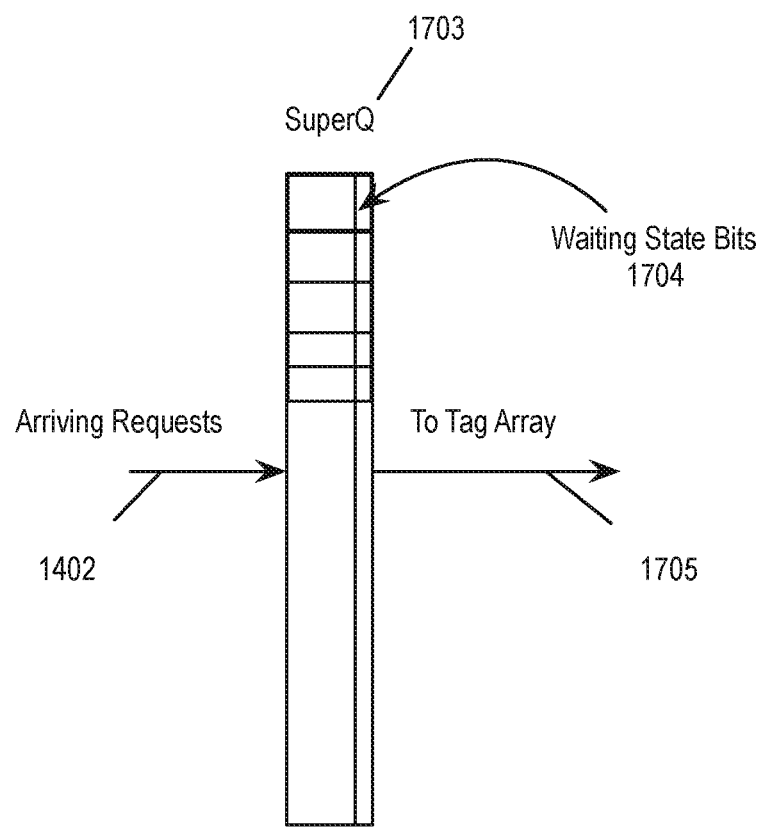
FIG. 17 is a block diagram of cache memory architecture without a dedicated write combining buffer, according to an embodiment.

FIG. 17 is a block diagram of cache memory architecture 1700 without a dedicated write combining buffer, according to an embodiment. In this variation, arriving requests 1402 having partial writes are dispatched to a SuperQ 1703, as in the baseline cache architecture 1400 of FIG. 14. However, entries in the SuperQ 1703 can be put in waiting state 1704 such that the entries are not immediately dispatched to the tag array (1705). Partial writes are first placed in waiting state or merged with earlier partial writes. If a partial write ID the same line address is present in the SuperQ 1703, the new request is merged with the existing request and the byte-enable mask is updated to reflect the combined write operation. If a partial write to the same line, however, is not present in the SuperQ 1703 a new entry is allocated. In one embodiment a limit is placed on the number of entries in the SuperQ 1703 that can be taken up by waiting partial writes. If the number of waiting partial writes in the SuperQ 1703 is maxed out, the oldest waiting partial write request in the SuperQ 1703 is removed from waiting state, without having been primed out, to proceed as in the baseline architecture.

Therefore, partial writes remain in waiting state in the SuperQ 1703 until one of the following conditions are met: (a) the line being written to is primed out by following writes, (b) a read for the same line address arrives, (c) a stalling flush arrives, or (d) the number of waiting partial writes in the SuperQ 1703 is maxed out, the request is the oldest of such requests and a new partial write request arrives that is destined to a line not present in the SuperQ 1703. When a line is ready to leave the waiting state in the SuperQ 1703, for any of the identified reasons above, a state bit of the entry in the SuperQ 1703 is flipped. If a partial write has been primed when leaving waiting state, the partial write is marked as a full-line write, thus not requiring a fill on miss. If a read to the same line as a request in waiting state arrives, the partial write is first released from waiting state and then the read is pushed to the SuperQ 1703.

Figure 18:
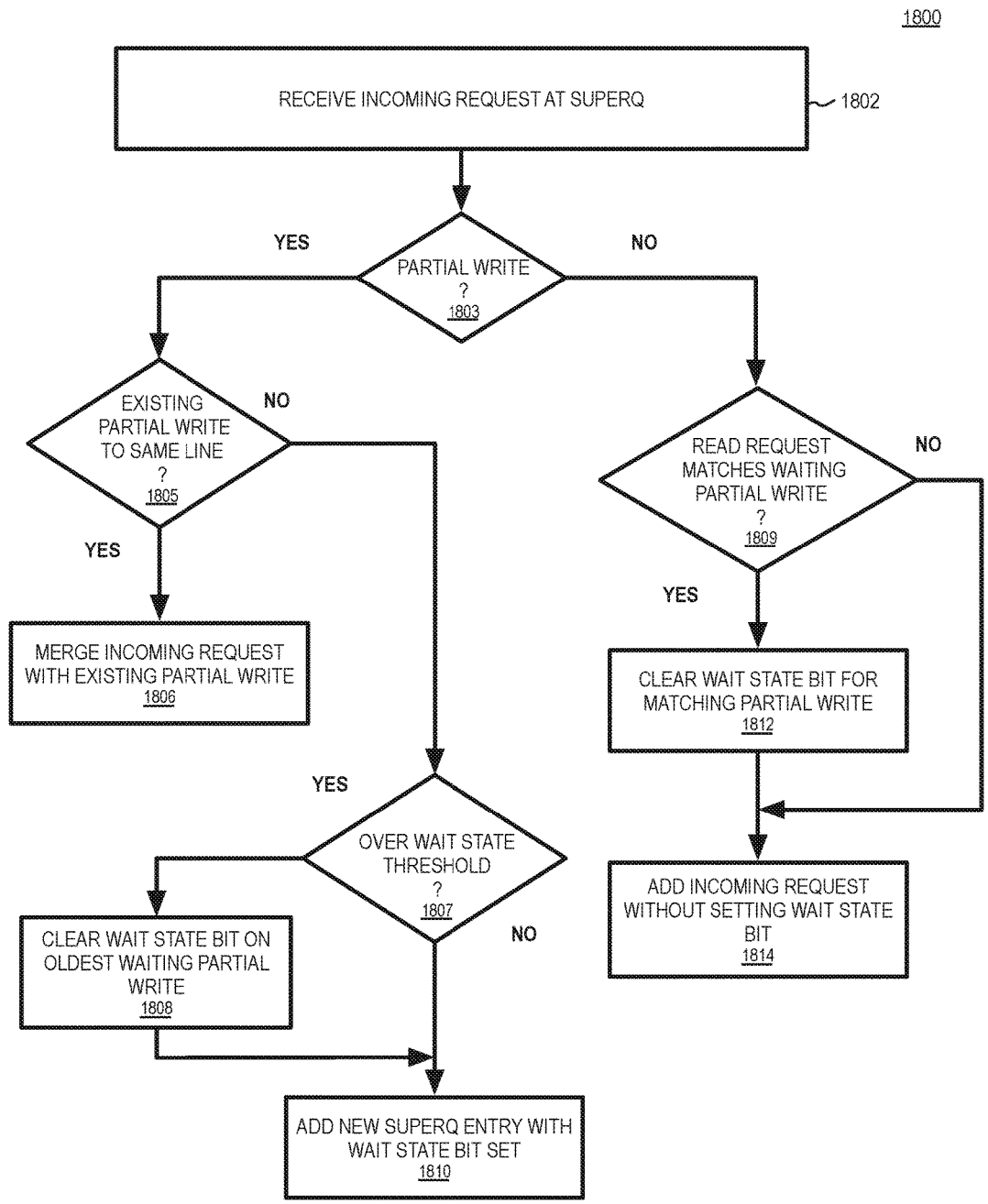
FIG. 18 is a flow diagram of logic associated with cache memory without a dedicated write combining buffer, according to an embodiment.

FIG. 18 is a flow diagram of a method 1600 performed by cache control circuitry associated with cache memory without a dedicated write combining buffer, according to an embodiment. The method 1800 can be performed by a cache control mechanism associated with a processor that includes a cache memory such as the cache memory 1700 as in FIG. 17. The cache control mechanism can be, for example, cache control logic 1920 illustrated in FIG. 19. The cache memory includes a SuperQ 1703 as in FIG. 17, in which each entry in the SuperQ 1703 includes a waiting state bit 1704.

As shown at 1802, the method 1800 includes receiving an incoming request at the SuperQ of the cache memory. The cache control mechanism can then determine of the incoming request is a partial write at 1803. If the cache control mechanism determines that the incoming request is a partial write at 1803, the logic can then determine if the incoming partial write request shares a cache line with an existing partial write, as shown at 1805. If there is an existing partial write to the same cache line, then the cache control mechanism can merge the incoming request with an existing partial write, as shown at 1806. The merge at 1806, alone or in combination with subsequent merges, can prime out the cache line and enable the logic to perform a full cache line write from the combined partial cache line writes.

In one embodiment a limit is placed on the number of entries in the SuperQ that can be taken up by waiting partial writes. In such embodiment, if the cache control mechanism determines that there is not an existing partial write to the same cache line at 1805, the cache control mechanism can determine if the SuperQ is over a wait state threshold at 1807 before adding a new SuperQ entry with the wait state bit set at 1810. If the SuperQ is over the wait state threshold at 1808, the cache control mechanism can clear the wait state bit on the oldest waiting partial write, as shown at 1808, before adding the new SuperQ entry with the wait state bit set at 1810.

If the cache control mechanism receives an incoming request at the SuperQ at 1802 and determines that the incoming request is not a partial write at 1803, the cache control mechanism can determine if the incoming request is a read request that matches a waiting partial write at 1809 (e.g., a partial write entry in the SuperQ that has the wait state bit set).

If the cache control mechanism determines that the read request does not match a waiting partial write at 1809, the cache control mechanism can add the incoming request to the SuperQ at 1814. The request is added at 1814 without the wait state bit set, such that the request can be dispatched to the cache in the normal process as in the baseline cache architecture. If the cache control mechanism determines that the read request matches a waiting partial write at 1809, the cache control mechanism can clear the wait state bit for the matching partial write at 1812 before adding the incoming request at 1814.

Aging Mechanism and Cache Implementations

Embodiments that provide a cache implementation using the WCB 1501 as in FIG. 15 or a waiting state 1704 as in FIG. 17 can each be implemented with an aging mechanism to allow partial writes in the WCB 1501 or waiting state 1704 that do not prime out in a timeline manner from becoming a bottleneck in the cache memory system, which can slow down overall system performance. The aging mechanism can be implemented using programmable counter logic associated with the cache, such that any partial write in the WCB or waiting in the SuperQ will be sent to the cache, even if the full cache line associated with the partial write has not been primed.

Figure 19:
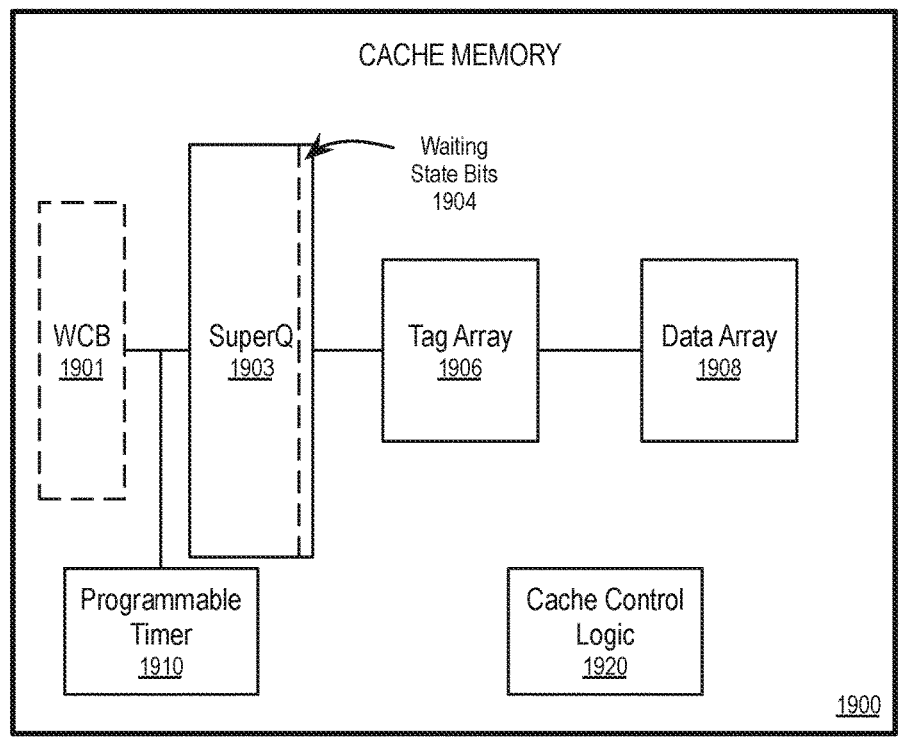
FIG. 19 is a block diagram of a cache memory, according to an embodiment.

FIG. 19 is a block diagram of a cache memory 1900, according to an embodiment. The cache memory 1900 can be implemented in a manner similar to the baseline cache architecture 1400 of FIG. 14, with a SuperQ 1903, tag array 1906, and a data array 1908. Additionally, cache control logic 1920 is included to configure and control cache memory operations. In one embodiment the cache control logic 1920 is a cache control circuit. In various embodiments, partial cache line writes to the cache memory 1900 can be combined using a write combine buffer (WCB 1901) or waiting state bits 1904 within the SuperQ 1903. In one embodiment the WCB 1901 is included in the cache memory 1900 and operates similar to the WCB 1501 of FIG. 15 using the method 1600 illustrated in FIG. 16. In one embodiment, the WCB 1901 is excluded and the SuperQ 1903 (e.g., request ordering buffer) is configured with waiting state bits 1904. The SuperQ 1903 and waiting state bits 1904 can operate similar to the SuperQ 1703 and waiting state bits 1704 as in FIG. 17 using the method 1800 as in FIG. 18. In each implementation, a programmable timer 1910 can be configured to enable an aging mechanism for waiting entries, such that partial writes waiting in the WCB 1901 or SuperQ 1903 will be evicted after a period of time, even if those partial writes are not primed out, to prevent the partial write combining mechanism from becoming a bottleneck to throughput for the cache memory 1900. In one embodiment, in response to a timer event triggered by the programmable timer 1910, cache control logic 1920 can remove a waiting entry in the WCB 1901 or the SuperQ 1903 and forward the entry along the cache control pipeline, which can include performing one or more partial writes to the cache.

Figure 20:
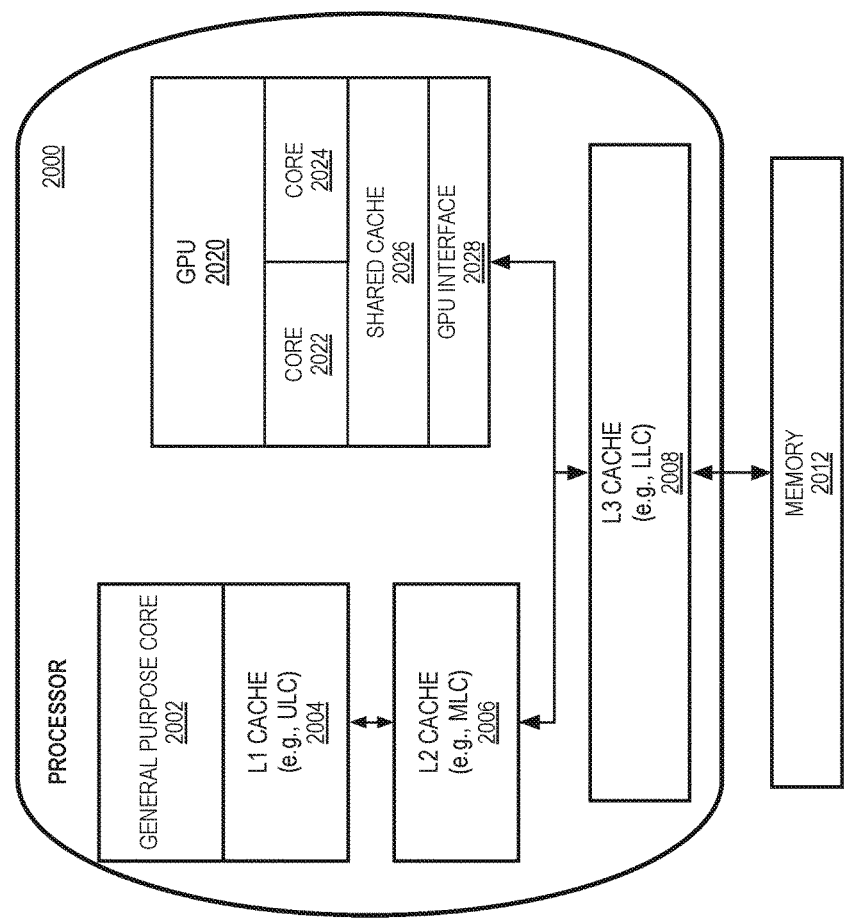
FIG. 20 is an illustration of a heterogeneous processor having a multi-level cache, according to an embodiment.

FIG. 20 is an illustration of a heterogeneous processor 2000 having a multi-level cache, according to an embodiment. The processor 2000 includes at least one general purpose core 2002, with various embodiments including various numbers of processor cores. Each processor core 2002 includes includes a level one (L1) cache 2004, which may also be referred to as an upper-level cache (ULC). The L1 cache 2004 can be divided into separate instruction caches and data caches, or can be a unified cache including instructions and data. The processor 2000 also includes a level two (L2) cache 2006, which may also be referred to as a mid-level cache (MLC). In one embodiment the L2 cache 2006 is a unified cache that includes instructions and data. The L2 cache 2006 can be specific to the processor core 2002 or can be shared with other cores within the processor 2000. The processor also includes a level three (L3) cache 2008, which may also be referred to as a last level cache (LLC). In the illustrated processor 2000, the L3 cache 2008 is the third level of the cache hierarchy within the processor 2000. The L3 cache 2008 can be used to cache data that is retrieved from memory 2012. While the L3 cache 2008 is illustrated as the last level of the cache hierarchy of the processor 2000, some embodiments include other levels of cache memory within the processor 2000, such as a level 4 (L4) cache within a portion of an embedded DRAM. For example, the memory 2012 may be an embedded DRAM that includes or is configured as an L4 cache.

In one embodiment the processor 2000 additionally includes a GPU 2020 for performing graphics and parallel compute operations (e.g., GPGPU operations). The illustrated GPU includes two GPU cores (e.g., GPU core 2022, GPU core 2024), although some embodiments include a single core or three or more cores within the GPU 2020. Each of the GPU cores can be a collection of execution units or graphics processing clusters having a set of streaming multiprocessors. GPU core 2022 and GPU core 2024 can each connect to a shared cache 2026 to cache data for use by either or both of the GPU cores. The GPU can interface with non-GPU components of the processor via a GPU interface 2028 and can share at least some data with the general purpose core 2002 via the L3 cache 2008.

Some embodiments described herein can be applied specifically to combine partial writes to the shared cache 2026 of the GPU 2020 to reduce the number of wasted cycles across the GPU interface 2028. In some common GPGPU workload, a large number writes may be performed in batches such that each individual write would result in a partial cache line write, but the aggregate set of writes would prime out a full cache line write. If each partial write were handled separately, wasted traffic can occur over the GPU interface 2028 as fills are performed for each partial write, only to have the filled data overwritten by subsequent partial writes that follow. Thus, in one embodiment the shared cache 2026 of the GPU 2020 can be implemented in a manner similar to the cache memory 1900 of FIG. 19, using either the WCB 1901 or wait state enabled SuperQ 1903.

Figure 21:
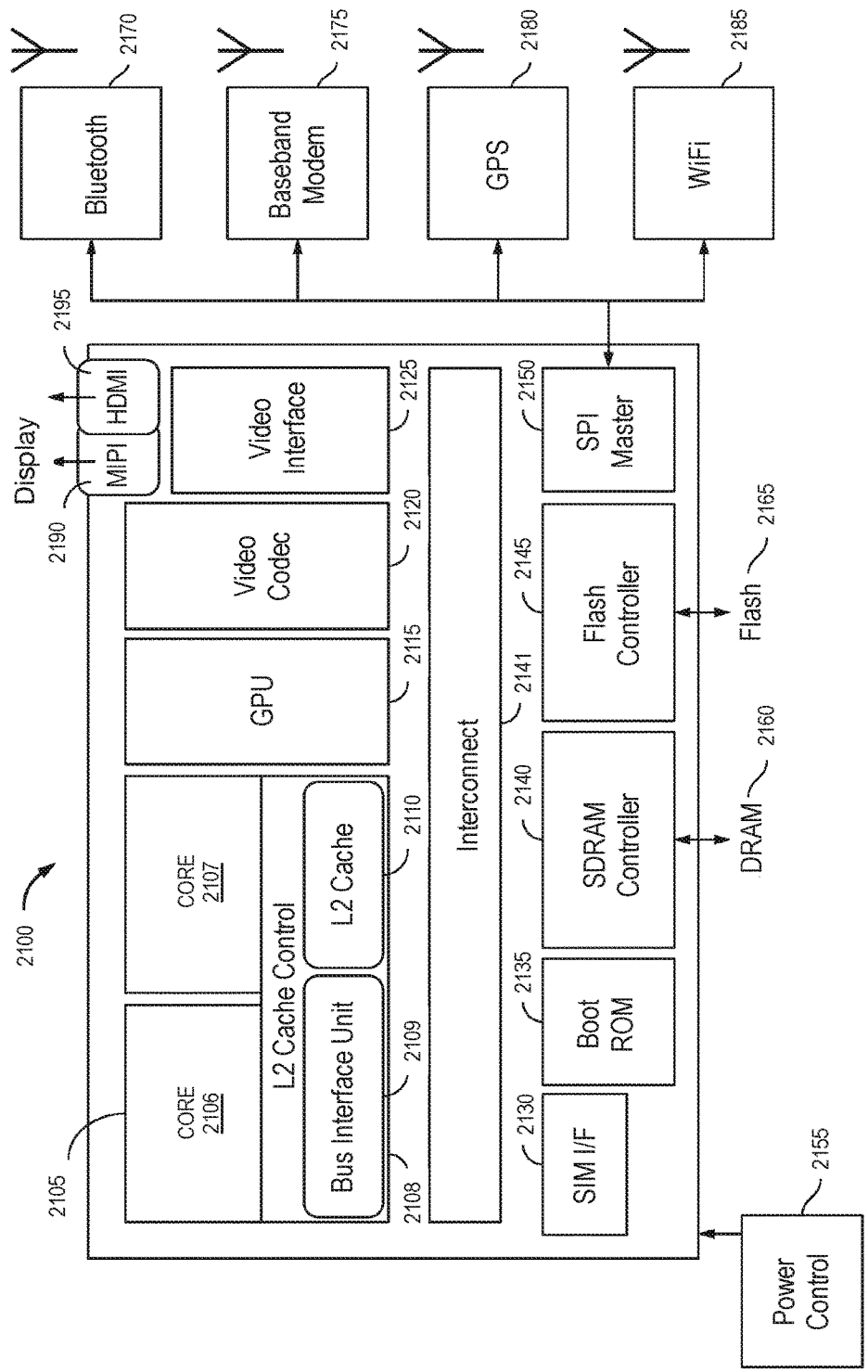
FIG. 21 is a block diagram of a processing system 2100 according to embodiments described herein.

FIG. 21 is a block diagram of a processing system 2100 according to embodiments described herein. The processing system 2100 may include any number of components suitable for enabling embodiments described herein. For example, the processing system 2100 may include processing entities such a general-purpose processor 2105 including as one or more processor cores (e.g., cores 2106, 2107) and at least one graphics processing unit (e.g., GPU 2115). The cores 2106, 2107 may be communicatively coupled to the rest of processing system 2100 through any suitable mechanism, such as through a bus or cache. In one embodiment, the cores 2106, 2107 may be communicatively coupled through an L2 cache control 2108, which may include a bus interface unit 2109 and an L2 cache 2110. In one embodiment, the L2 cache 2110 can be implemented using elements of the cache memory 1900 of FIG. 19. The cores 2106, 2107 and GPU 2115 may be communicatively coupled to each other and to the remainder of the processing system 2100 through an interconnect 2141. In one embodiment the GPU 2115 may couple with a video codec 2120 that defines the manner in which particular video signals will be encoded and decoded for output.

The processing system 2100 may also include any number or kind of interfaces, controllers, or other mechanisms for interfacing or communicating with other portions of an electronic device or system. Such mechanisms may facilitate interaction with, for example, peripherals, communications devices, other processors, or memory. For example, the processing system 2100 may include a video interface 2125, a subscriber interface module (SIM) interface 2130, a boot ROM interface 2135, a synchronous dynamic random access memory (SDRAM) controller 2140, a flash controller 2145, and a serial peripheral interface (SPI) master unit 2150. The video interface 2125 may provide output of video signals from, for example, GPU 2115 and through, for example, a mobile industry processor interface (MIPI) 2190 or a high-definition multimedia interface (HDMI) 2195 to a display. Such a display may include, for example, an LCD or LED based display. SIM interface 2130 may provide access to or from a SIM card or device. SDRAM controller 2140 may provide access to or from memory (e.g., DRAM 2160) such as an SDRAM chip or module. Flash controller 2145 may provide access to or from memory such as flash memory 2165 or other instances of RAM. SPI master unit 2150 may provide access to or from communications modules, such as a Bluetooth module 2170, high-speed 3G modem 2175, global positioning system module 2180, or wireless module 2185 implementing a communications standard such as 802.11. Additionally, a power control unit 2155 can be used to manage an overall and individualized power state for components of the processing system 2100.

Figure 22:
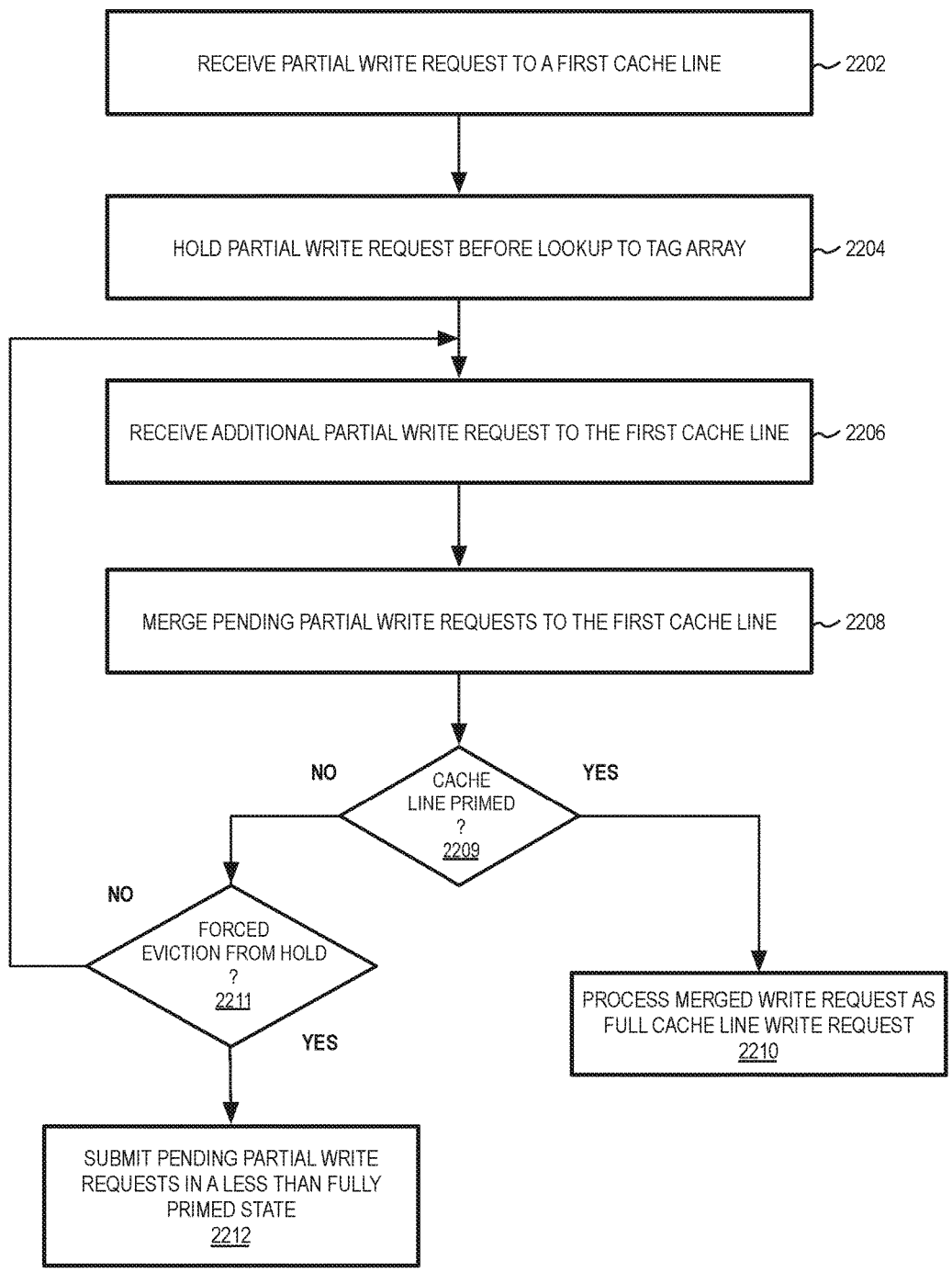
FIG. 22 is a flow diagram of a general process of combining partial cache line writes upon entry to a cache memory, according to an embodiment.

FIG. 22 is a flow diagram of a general process 2200 of combining partial cache line writes upon entry to a cache memory, according to an embodiment. A cache memory as described herein can receive a partial write request to a first cache line, as shown at 2202. Using either a write combining buffer (WCB) or a hold state enabled ordering buffer (e.g., SuperQ), cache control logic can hold the partial write request before performing an address lookup for the request in a tag array at 2204. The hold can be performed by storing the request in a WCB or storing the request in the host state enabled ordering buffer with the hold bit set for the request. Operations of the process 2200 can continue when the cache memory receives an additional partial write request to the first cache line at 2206. Upon receipt of the additional partial write request to the first cache line, cache logic, such as the cache control logic, can merge the pending partial write requests to the first cache line. Any non-partial-write requests that do not map to the first cache line can be processed as illustrated in FIG. 16 and FIG. 18.

As determined at 2209, if the merge of the pending partial write requests at 2208 results in a primed cache line, cache control logic can process the merged write request as a full cache line write request at 2210. For example, if the cache memory supports byte valid bits, all valid bits for the cache line can be set. Alternatively, if the cache memory is configured to perform a read-modify-write to fill the cache line upon partial writes, no such fill operation will be required. If the merge at 2208 is determined to have not fully primed the cache line, as determined at 2209, the process 2200 can continue to determine whether the pending partial write should be forcefully evicted from the hold state at 2211. A partial write that is not fully primed can be evicted from the hold state and processed as a partial write for one or more reasons, including but not limited to a hold period timeout due to aging, exceeding a limit of ordering buffer (e.g., Super Q) entries in a waiting state, receiving a read request to an address associated with a pending partial write, and/or receiving a stalling flush that causes all pending requests to be processed immediately. Under such circumstances, cache control logic can submit any pending partial write requests in a less than fully primed state, as shown at 2212. If a forced eviction for the entry is not required at 2211, the cache control logic can continue to wait for subsequent requests that can be merged, for example, if the cache were to receive additional partial write requests to the first cache line at 2206. Even if the partial writes cannot be merged to complete a full cache line, the number of partial writes to the cache may be reduced, which may reduce the memory bandwidth required to perform the fill operations needed for partial cache line writes.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Embodiments are implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a memory system comprising a cache memory and a circuit including cache control hardware logic to receive a request to perform a partial cache line write to a first cache line of the cache memory, merge the request to perform the partial cache line write with a pending request to write to the first cache line, and process a merged request as a full cache line write. In one embodiment the cache memory of the memory system includes a tag array to store at least a portion of an address for data stored in the cache memory and a data array to store the first cache line. In one embodiment the memory system additionally includes an ordering buffer to maintain an order of cache memory requests arriving at the memory system.

One embodiment provides a processing apparatus comprising a processor core, a cache memory shared by one or more components of the processor core, and a cache control logic circuit to receive a request to perform a partial cache line write to a first cache line of the cache memory, merge the request to perform the partial cache line write with a pending request to write to the first cache line, and process a merged request as a full cache line write.

One embodiment provides for a method managing access requests to a cache memory, the method comprising receiving a first partial write request to a first cache line of a cache memory, holding the first partial write request before performing a lookup for the first partial write request to tag array for the cache memory, receiving a second partial write request to the first cache line, merging the first partial write request and the second partial write request, and processing a merged request to the first cache line as a full cache line request.

One embodiment provides for a data processing system comprising means for performing a method of managing access requests to a cache memory as in a method or process as described herein.

One embodiment provides for a machine-readable medium having stored thereon data, which if performed by at least one machine, causes the at least one machine to fabricate at least one integrated circuit to perform a method or process of managing access requests to a cache memory as described herein.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A memory system comprising:
   a cache memory comprising a tag array to store at least a portion of an address for data stored in the cache memory;
   and
   a cache control circuit to receive a first request to perform a partial cache line write to a first cache line of the cache memory, merge the first request to perform the partial cache line write with a pending request to write to the first cache line to provide a merged request, and process the merged request as a full cache line write request before sending to the tag array.

2. The memory system as in claim 1, the cache memory including a data array to store the first cache line.

3. The memory system as in claim 2, additionally comprising an ordering buffer to maintain an order of cache memory requests arriving at the memory system.

4. The memory system as in claim 3, additionally comprising a write combining buffer coupled with the ordering buffer, the write combining buffer to store the pending request to write to the first cache line.

5. The memory system as in claim 4, the write combining buffer to store the pending request to write to the first cache line until the pending request is to be merged with the received first request to write to the first cache line.

6. The memory system as in claim 4, the write combining buffer to store the pending request to write to the first cache line until the pending request is evicted from the write combining buffer, the pending request to be evicted from the write combining buffer in response to at least one event in a set of events, the set of events including a timer event associated with the pending request.

7. The memory system as in claim 6, the set of events additionally including
   a read request associated with the first cache line;
   a stalling flush; and
   receipt of an additional partial write request not to the first cache line while the write combining buffer is full.

8. The memory system as in claim 1, the cache memory including a tag array to store at least a portion of an address for data stored in the cache memory and a data array to store multiple lines of cached data and wherein the memory system additionally comprises an ordering buffer to maintain an order of cache memory requests arriving at the memory system, at least a portion of entries in the ordering buffer including a bit to indicate an entry is in a waiting state.

9. The memory system as in claim 8, wherein the pending request to write to the first cache line is to be stored in the ordering buffer in the waiting state.

10. The memory system as in claim 8, wherein the pending request is to be stored in the ordering buffer in the waiting state until the pending request is to be merged with the received first request to write to the first cache line or removed from the waiting state in response to at least one event in a set of events, the set of events including a timer event associated with the pending request.

11. A processing apparatus comprising:
   a processor core;
   a cache memory shared by one or more components of the processor core, the cache memory comprising a tag array to store at least a portion of an address for data stored in the cache memory; and
   a cache control circuit to receive a first request to perform a partial cache line write to a first cache line of the cache memory, merge the first request to perform the partial cache line write with a pending request to write to the first cache line to provide a merged request, and process the merged request as a full cache line write request before sending to the tag array.

12. The processing apparatus as in claim 11, wherein the processor core is a general purpose processor.

13. The processing apparatus as in claim 11, wherein the processor core is a graphics processor.

14. The processing apparatus as in claim 13, wherein the cache control circuit is to merge multiple partial write requests associated with a set of multiple graphics processor operations into a single cache line write to the cache memory.

15. The processing apparatus as in claim 11, wherein the cache memory includes an ordering buffer to store access requests to the cache memory.

16. The processing apparatus as in claim 15, wherein the cache memory includes a write combine buffer coupled to the ordering buffer, the write combine buffer to store one or more pending partial writes to the cache memory in a waiting state before the one or more pending partial writes are to be submitted to the ordering buffer.

17. The processing apparatus as in claim 16, wherein the ordering buffer including a bit to indicate an entry in the ordering buffer is in a waiting state and one or more pending partial writes to the cache memory are to be configured in the waiting state.

18. The processing apparatus as in claim 17, wherein the cache control circuit is to remove a pending partial write from the waiting state after the pending partial write is merged with an incoming write.

19. A method managing access requests to a cache memory, the method comprising:
   receiving a first partial write request to a first cache line of a cache memory comprising a tag array to store at least a portion of an address for data stored in the cache memory;
   holding the first partial write request before performing a lookup for the first partial write request to tag array for the cache memory;
   receiving a second partial write request to the first cache line;
   merging the first partial write request and the second partial write request to provide a merged request; and
   processing the merged request to the first cache line as a full cache line request before sending to the tag array.

20. The method as in claim 19, additionally comprising:
   storing the first partial write request in a write combining buffer associated with the cache memory;
   receiving the second partial write request at the write combining buffer; and
   merging the first partial write request with the second partial write request in the write combining buffer.

21. The method as in claim 19, additionally comprising:
   storing the first partial write request in an ordering buffer associated with the cache memory;
   setting a wait state bit associated with the first partial write request;
   receiving the second partial write request at the ordering buffer; and
   merging the first partial write request with the second partial write request in the ordering buffer.

22. The method as in claim 19, wherein processing the merged request to the first cache line as the full cache line request includes:
   accessing a tag array associated with the cache memory to determine if an address associated with the full cache line request is present in the cache memory;
   determining that the full cache line request is a cache miss; and
   resolving the cache miss without performing a fill-read, wherein the cache miss is associated with multiple partial cache line writes merged into the full cache line request.

* * * * *